Aug. 20, 1935. F. L. MILLS Re. 19,674

GAME APPARATUS

Original Filed July 27, 1931 17 Sheets-Sheet 1

Inventor,
Fred L. Mills
By: Carl S. Pfleger
Atty.

GAME APPARATUS

Original Filed July 27, 1931 17 Sheets-Sheet 2

Inventor:
Fred L. Mills,
By: Carl S. Lloyd
Atty.

Aug. 20, 1935. F. L. MILLS Re. 19,674

GAME APPARATUS

Original Filed July 27, 1931 17 Sheets-Sheet 3

Inventor.
Fred L. Mills.
By Carl S. Lloyd
Atty.

GAME APPARATUS

Original Filed July 27, 1931 17 Sheets-Sheet 4

GAME APPARATUS

Original Filed July 27, 1931 17 Sheets-Sheet 5

Inventor.
Fred L. Mills.
By: Carl S. Rhoads
Atty.

GAME APPARATUS

Original Filed July 27, 1931 17 Sheets-Sheet 6

Inventor
Fred L. Mills.
By: Carl S. Rhodes
Atty.

Aug. 20, 1935. F. L. MILLS Re. 19,674

GAME APPARATUS

Original Filed July 27, 1931 17 Sheets-Sheet 7

Inventor,
Fred L. Mills.
By: Carl S. Lloyd
Atty.

Aug. 20, 1935. F. L. MILLS Re. 19,674

GAME APPARATUS

Original Filed July 27, 1931 17 Sheets-Sheet 8

Inventor,
Fred L. Mills.
By: Carl S. Lloyd
Atty.

Aug. 20, 1935. F. L. MILLS Re. 19,674

GAME APPARATUS

Original Filed July 27, 1931 17 Sheets-Sheet 9

Inventor:
Fred L. Mills,
By: Carl S. Lloyd
Atty.

GAME APPARATUS
Original Filed July 27, 1931 17 Sheets-Sheet 10
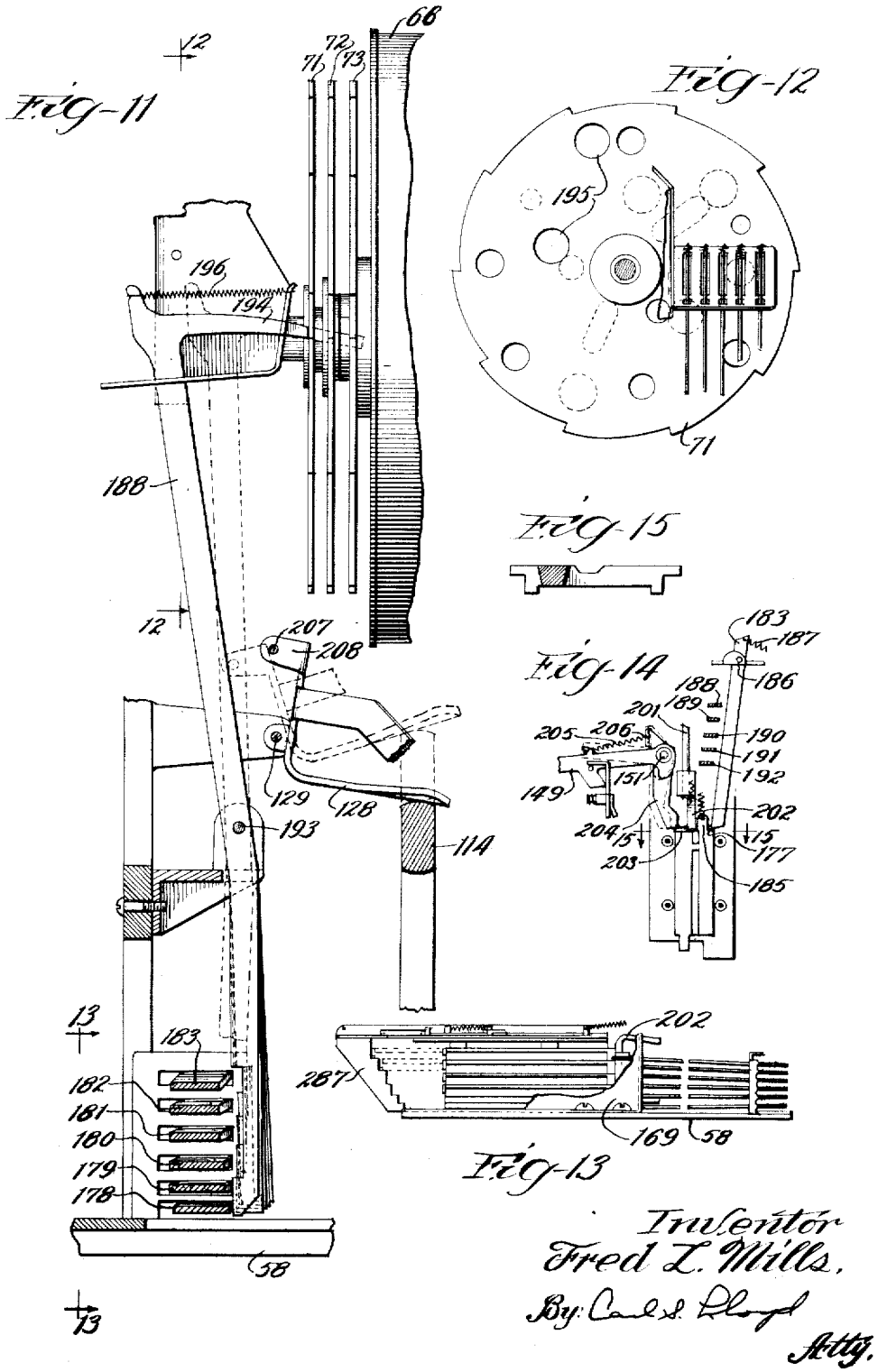
Inventor
Fred L. Mills,
By Carl S. Rhoads
Atty.

GAME APPARATUS

Original Filed July 27, 1931 17 Sheets-Sheet 11

Inventor.
Fred L. Mills.
By: Carl S. Lloyd
Atty.

GAME APPARATUS

Original Filed July 27, 1931 17 Sheets-Sheet 12

Inventor.
Fred L. Mills.
By: Carl S. Lloyd
Atty.

GAME APPARATUS

Original Filed July 27, 1931 17 Sheets-Sheet 13

Inventor
Fred L. Mills
By Carl S. Lloyd
Atty.

GAME APPARATUS

Original Filed July 27, 1931 17 Sheets-Sheet 14

Inventor.
Fred L. Mills.
By: Carl S. Rhoads
Atty.

GAME APPARATUS

Original Filed July 27, 1931 17 Sheets-Sheet 15

Inventor:
Fred L. Mills,
By: Carl S. Lloyd
Atty

GAME APPARATUS

Original Filed July 27, 1931 17 Sheets-Sheet 16

Inventor
Fred L. Mills.
By: Carl S. Lloyd
Atty.

GAME APPARATUS

Original Filed July 27, 1931 17 Sheets-Sheet 17

Inventor
Fred L. Mills.
By: Carl S. Rhoads
Atty

Reissued Aug. 20, 1935 Re. 19,674

UNITED STATES PATENT OFFICE 19,674

GAME APPARATUS

Fred L. Mills, Oak Park, Ill., assignor to Mills Novelty Company, Chicago, Ill., a corporation of Illinois Original No. 1,912,992, dated June 6, 1933, Serial No. 553,326, July 27, 1931. Application for reissue November 9, 1934, Serial No. 752,289

53 Claims. (Cl. 194—2)

This invention relates to a game apparatus having playing mechanism which may be manipulated by the operator to simulate the playing of a baseball game. The invention contemplates the provision of a game apparatus of this type which is provided with coin-operated means for controlling the playing of the game.

An object of the invention is to provide a game device having a playing field over which a series of player pieces may be moved, and in conjunction therewith and as a means for controlling the moves of the pieces, a coin-operated mechanism embodying a plurality of legend-displaying reels which are adapted to be driven by actuating the machine and which, when they come to rest, display a combination of legends which automatically determines the moves of the player pieces.

Another object of the invention is to provide a game apparatus of the type specified in which the movement of the player pieces is rendered subject to the skill of the operator through the provision of manually-operated control means for regulating the final positions of rest assumed by the legend-displaying reels.

Another object of the invention is to provide in combination with coin-controlled operating mechanism of a game apparatus, mechanism which is adapted, under certain conditions, to give the operator one or more free plays, there also being preferably provided a register device for indicating to the operator the number of free plays thus obtained.

Another object of the invention is to provide in a game apparatus provided with one or more rotatable elements, and coin-controlled mechanism for starting rotation thereof, means operatively connected with said starting mechanism for giving the operator a number of free plays determined in accordance with the position of rest assumed by said rotatable element or elements.

Further objects and advantages of the invention will be apparent as I proceed with my specification, which, taken in connection with the accompanying drawings, discloses a preferred embodiment thereof.

Referring to the drawings:

Fig. 11 is a detail section taken on line 11—11 of Fig. 7, and illustrating the release mechanism for controlling the positions of the slides which determine the moves of the player pieces;

Fig. 12 is a section as indicated by line 12—12 of Fig. 11, the section showing one of the ratchet discs which rotates with one of the legend-displaying reels;

Fig. 13 is a side view of the release slides taken as indicated by line 13—13 of Fig. 11;

Fig. 14 is a detail plan and sectional view showing the means for holding the release slides in their advanced position;

Fig. 15 is a transverse section through one of the release slides, the section being taken as indicated by line 15—15 of Fig. 14;

Figure 1:
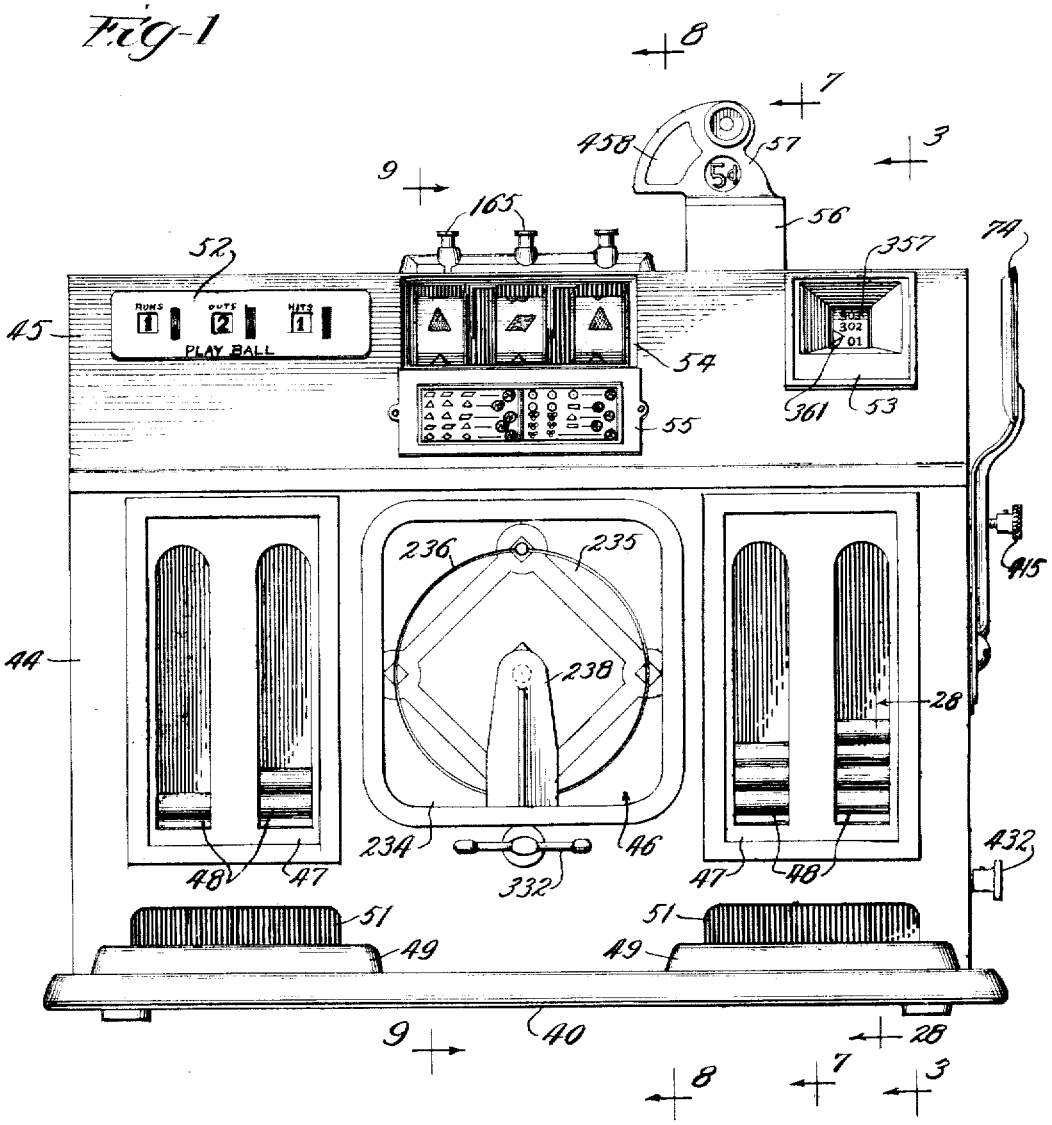
Fig. 1 is a front elevational view of a machine embodying the game mechanism and the coin-controlled means which regulates the playing of the game.
Figure 5:
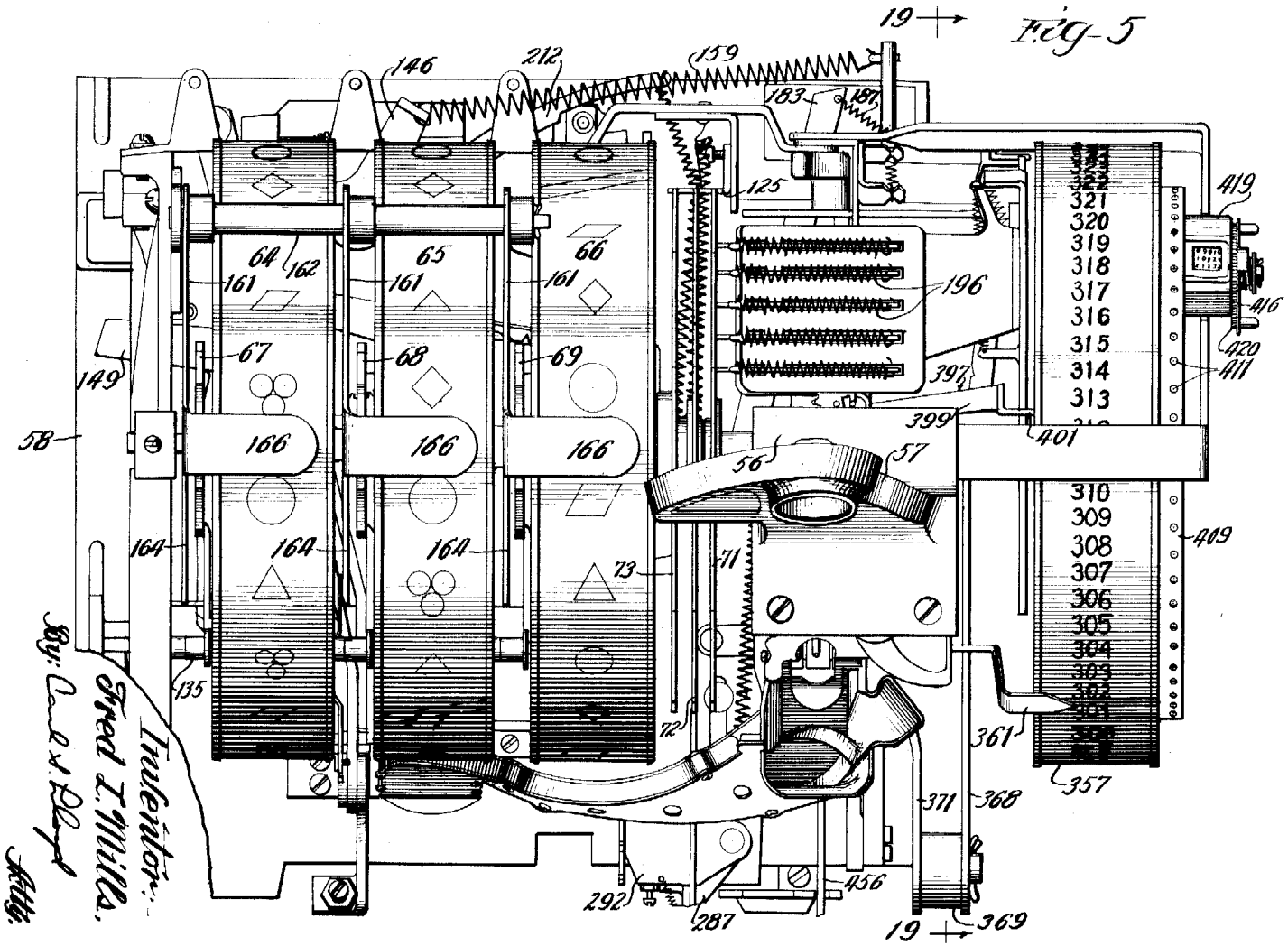
Fig. 5 is a top plan view, with the casing removed, of the coin-controlled and award mechanism.
Figure 6:
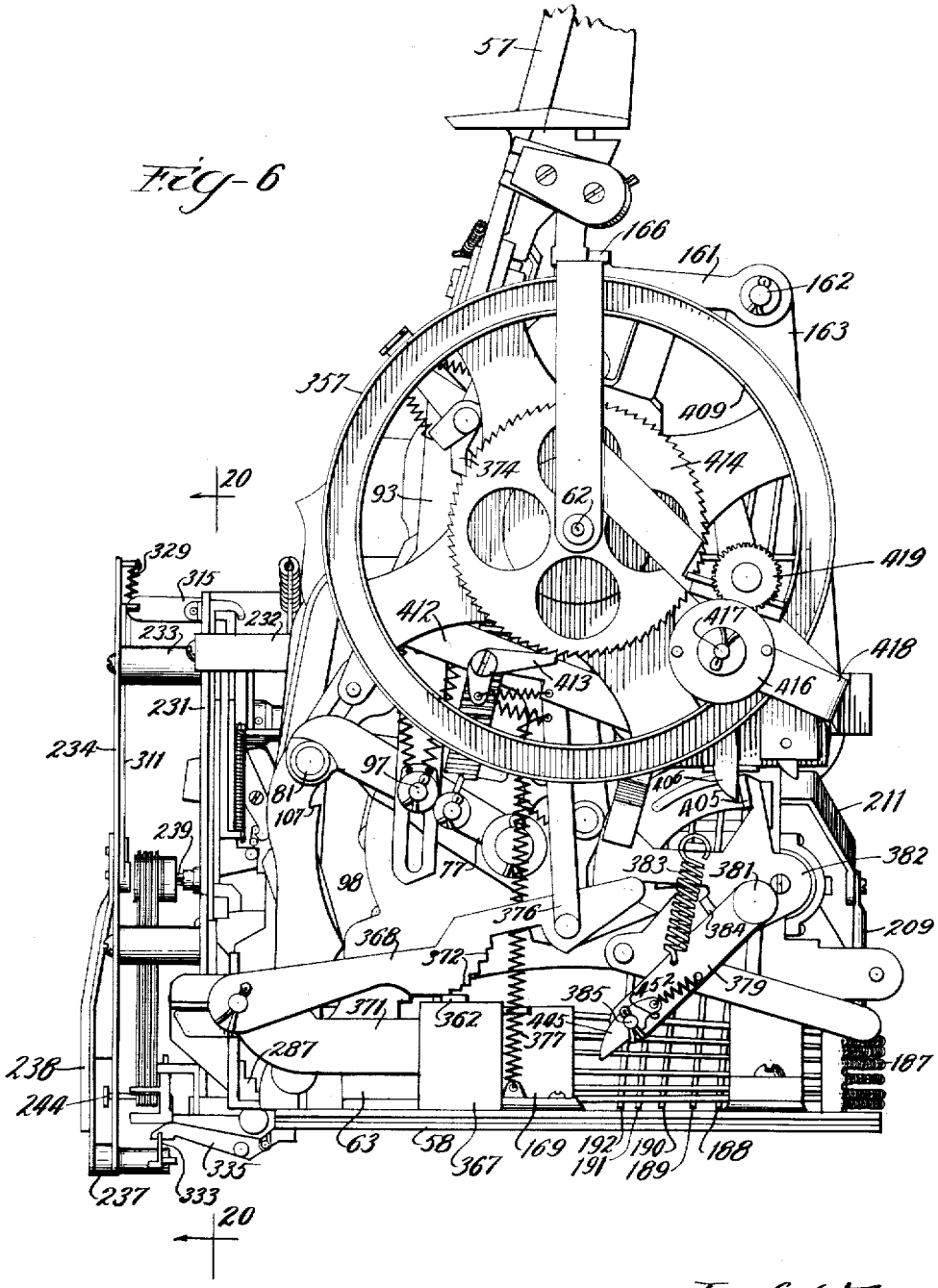
Fig. 6 is a side elevational view of the machine taken approximately as indicated by line 3—3 of Fig. 1, the casing being removed for clearer illustration.
Figure 16:
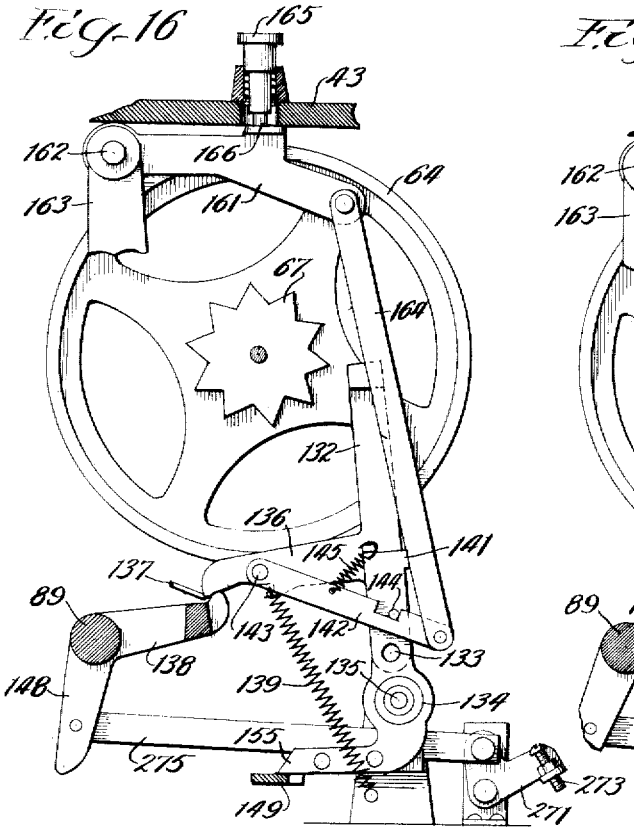
Figure 17:
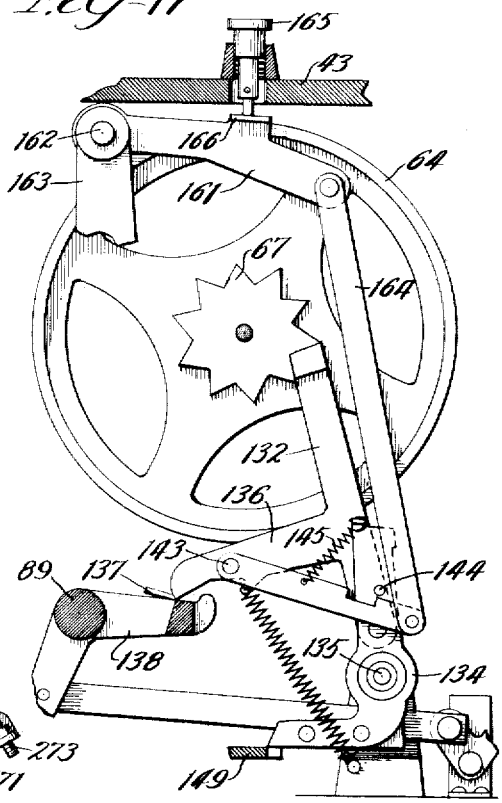
Figure 18:
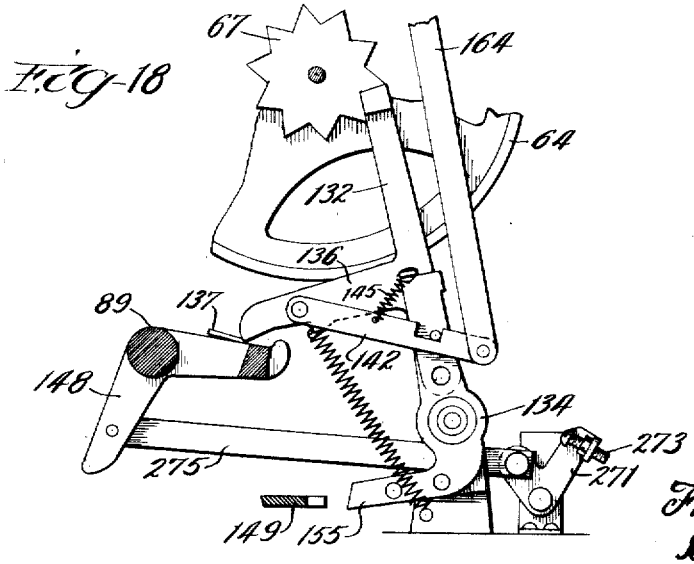
Figure 19:
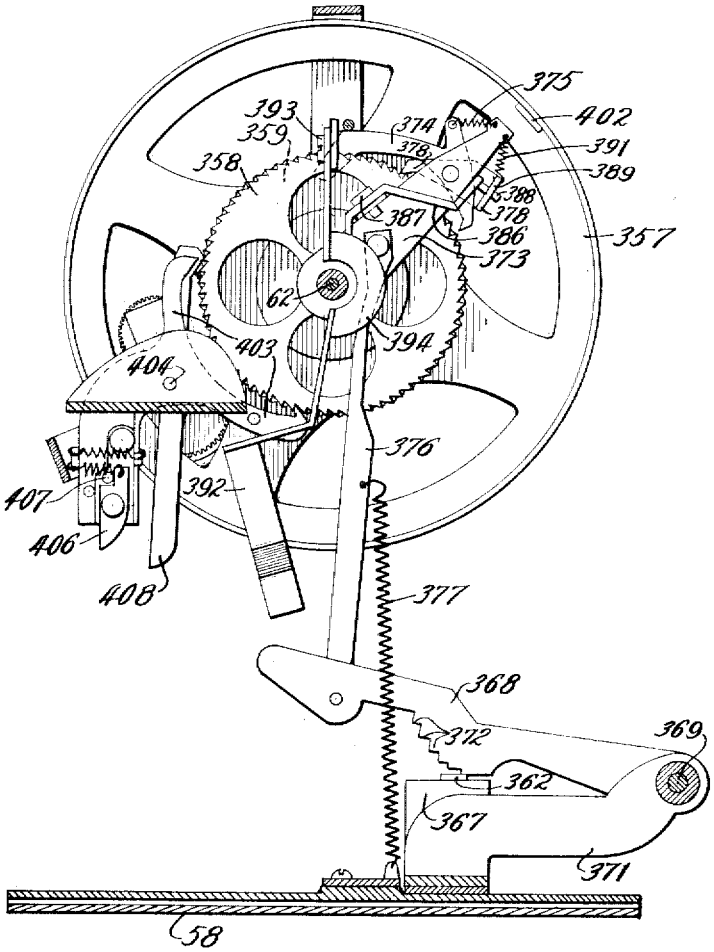
Figure 20:
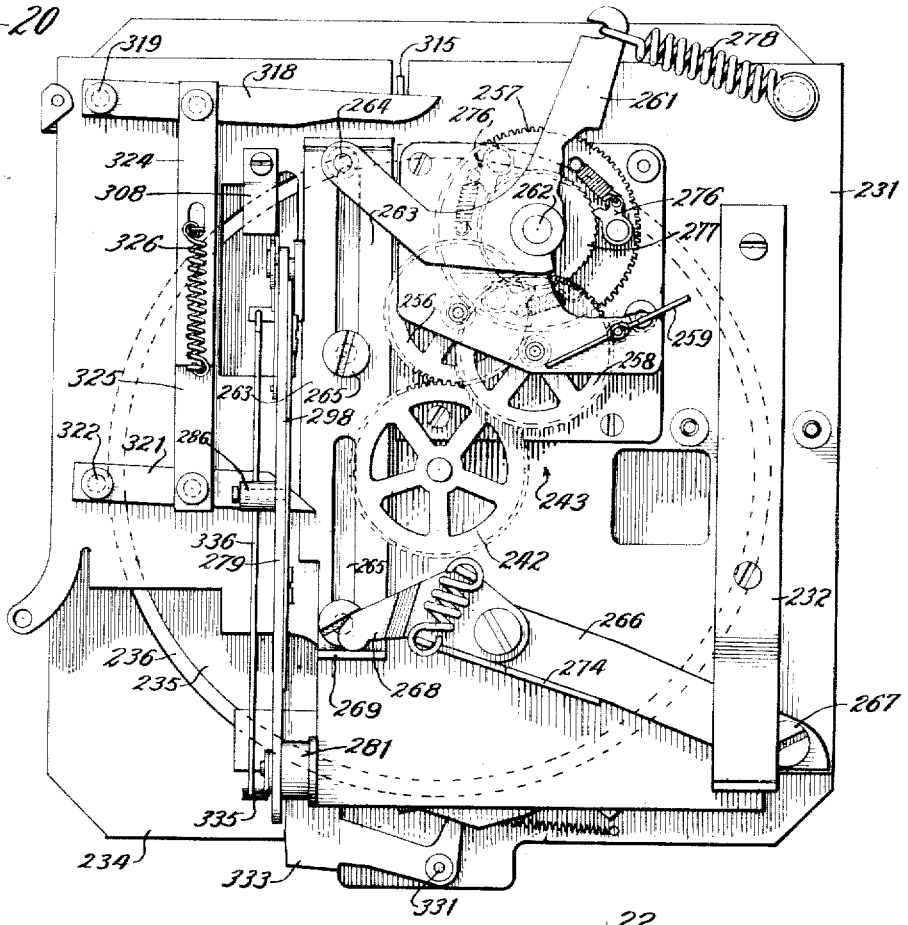
Figure 21:
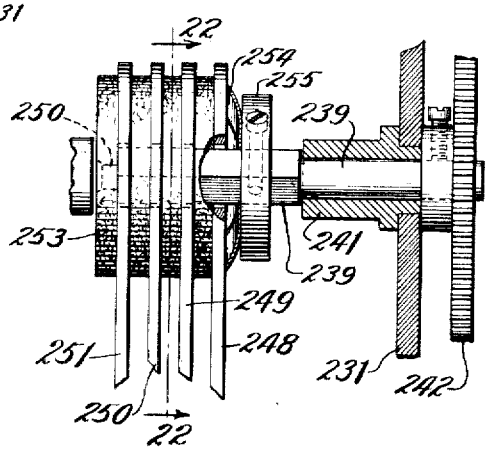
Figure 22:
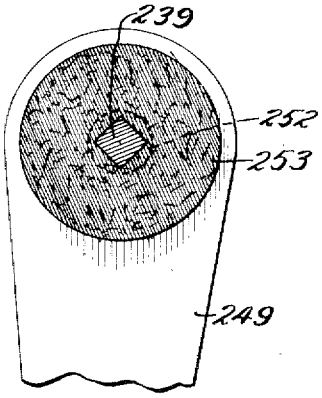
Figure 23:
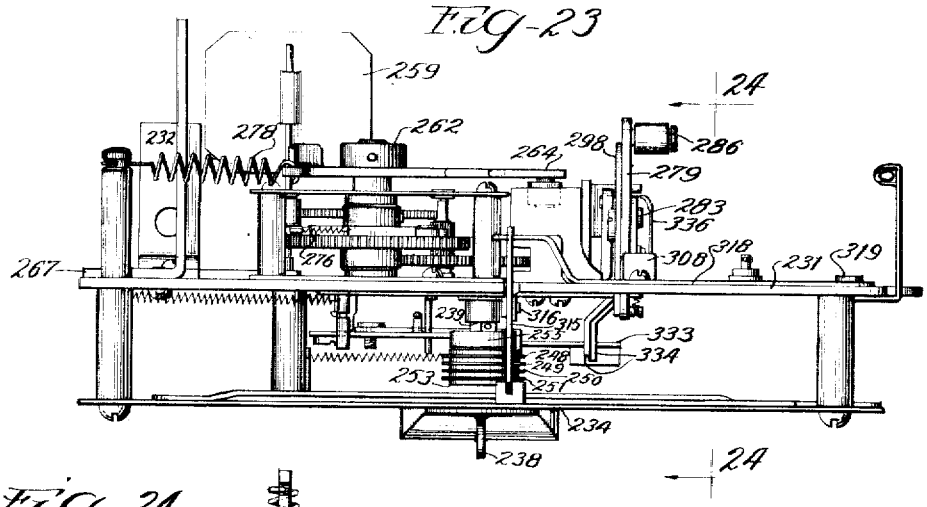
Figure 24:
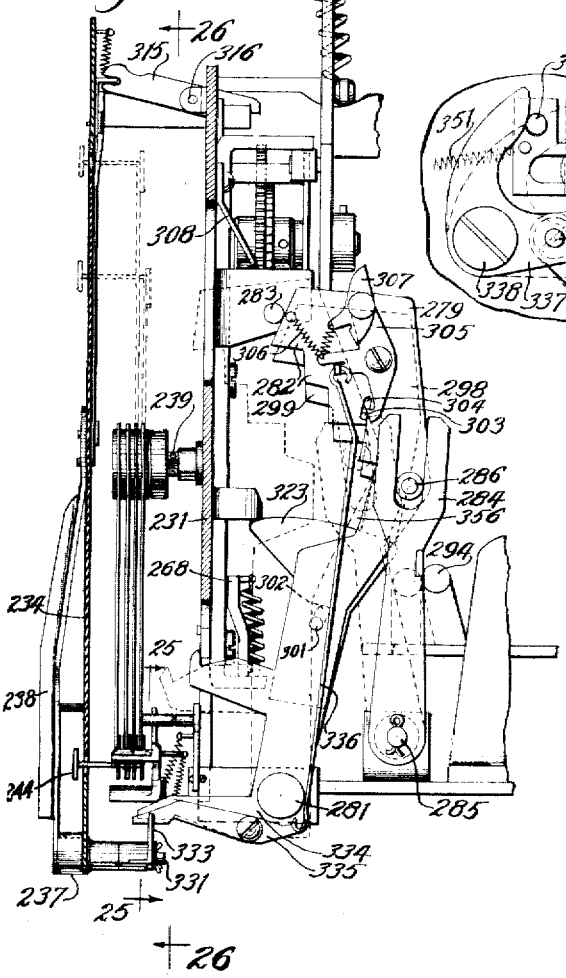
Figure 25:
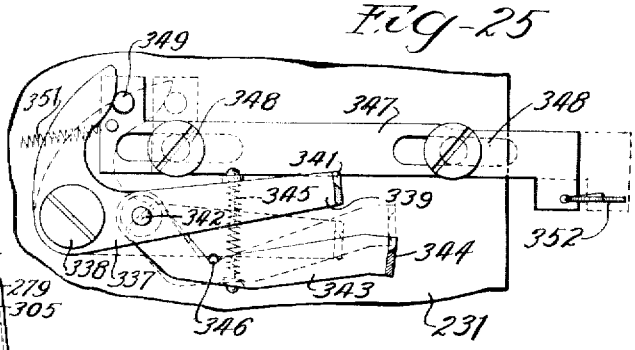
Figure 26:
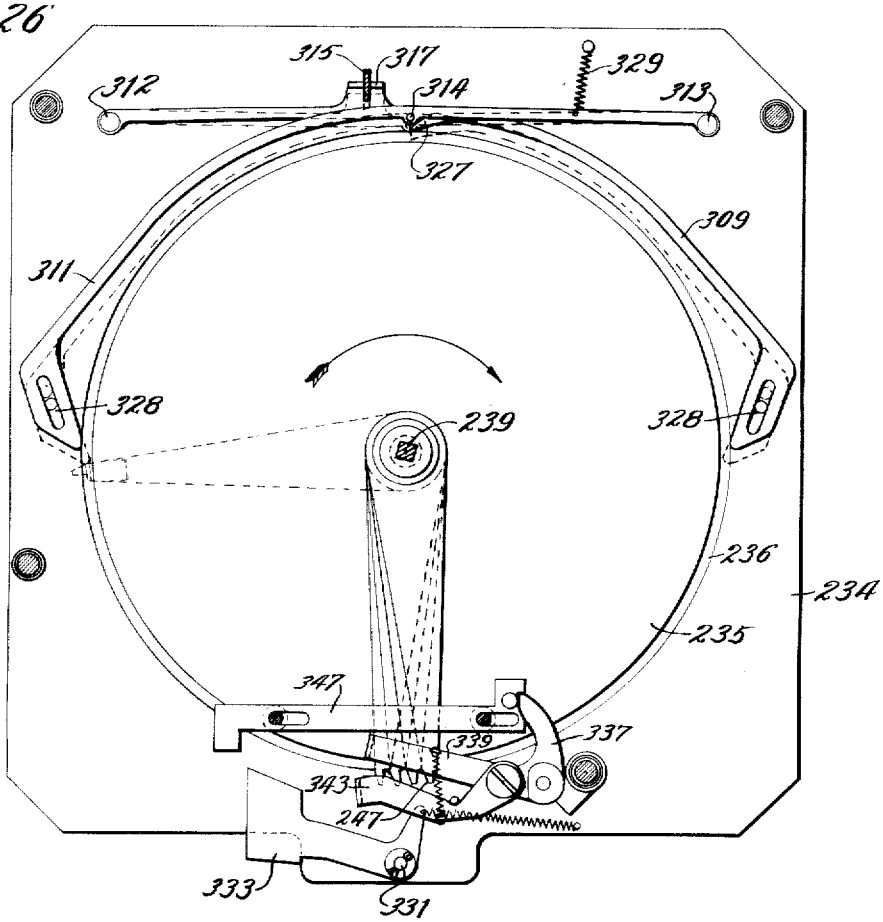
Figure 27:
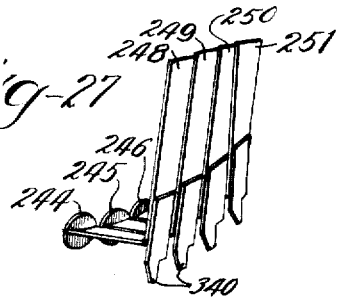
Figure 30:
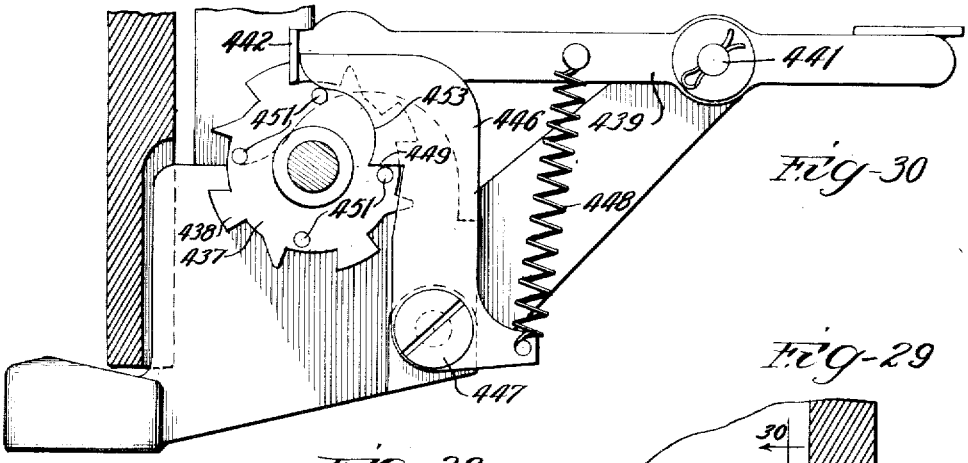
Figure 29:
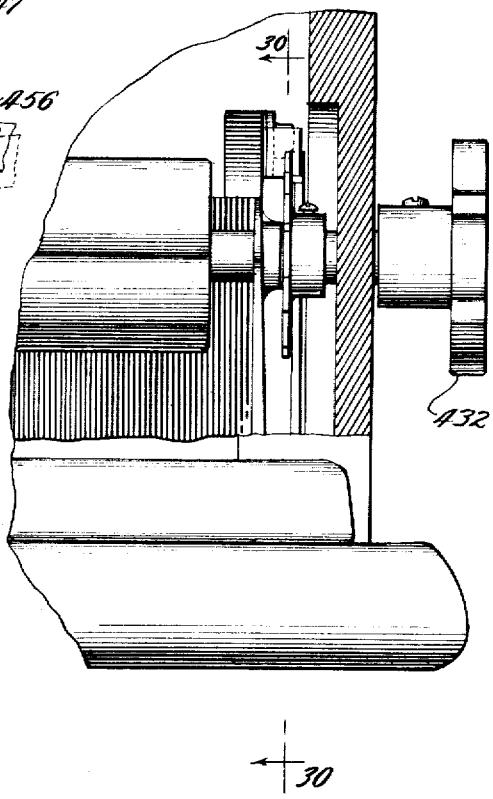
Figure 28:
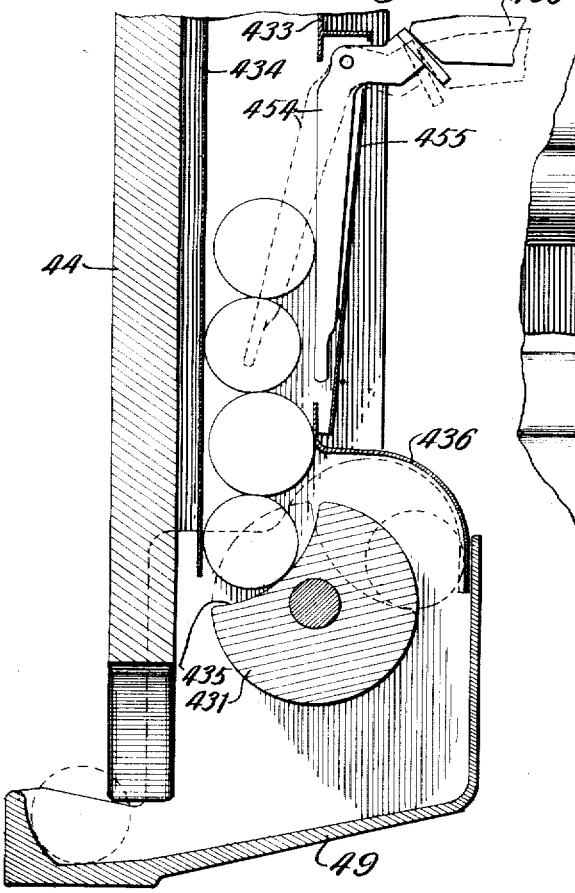
Figure 31:
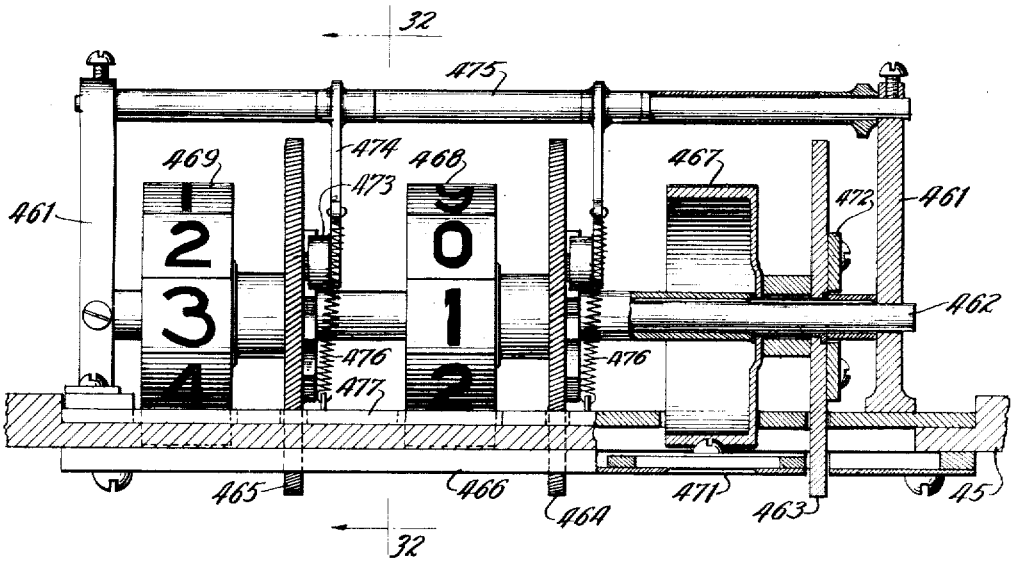
Figure 32:
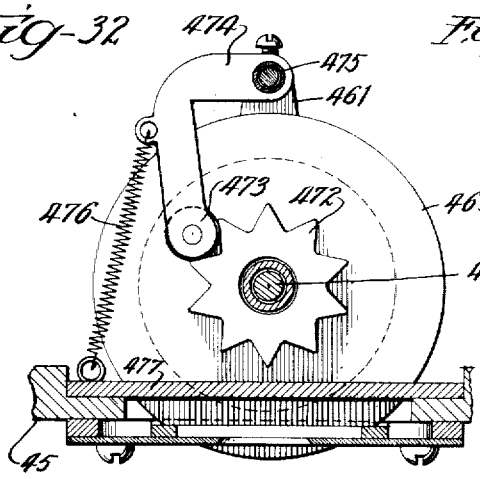

Figs. 16, 17, and 18 are elevational views, partly in section, illustrating several positions of the mechanism for controlling the stoppage of the legend reels;

Fig. 19 is a vertical section showing a portion of the award mechanism, the section being taken on line 19—19 of Fig. 5;

Fig. 20 is a rear elevational view of the mechanism which moves the player pieces around the playing field, the view being taken as indicated by line 20—20 of Fig. 6;

Fig. 21 is a fragmentary view, partly in section, showing the mounting of the arms which carry the player pieces;

Fig. 22 is a section taken on line 22—22 of Fig. 21;

Fig. 23 is a top plan view of the playing field and the mechanism for moving the player pieces around the field;

Fig. 24 is a transverse vertical section taken on line 24—24 of Fig. 23, the view showing the playing field and certain parts of the mechanism for controlling the movement of the player pieces;

Fig. 25 is a detail of the means employed for releasing the player pieces from the home base;

Fig. 26 is a rear view of the playing field, taken on line 26—26 of Fig. 24;

Fig. 27 is a fragmentary view of the player pieces and the lower ends of the arms to which they are secured;

Fig. 28 is a broken vertical sectional view illustrating the mint-vending mechanism, the section being taken on line 28—28 of Fig. 1;

Fig. 29 is a fragmentary elevational view, partly in section, showing the means for operating the mint-vending mechanism;

Fig. 30 is a detail section taken on line 30—30 of Fig. 29;

Fig. 31 is a broken plan sectional view of the score-recording devices;

Fig. 32 is a section taken on line 32—32 of Fig. 31; and

Figure 33:
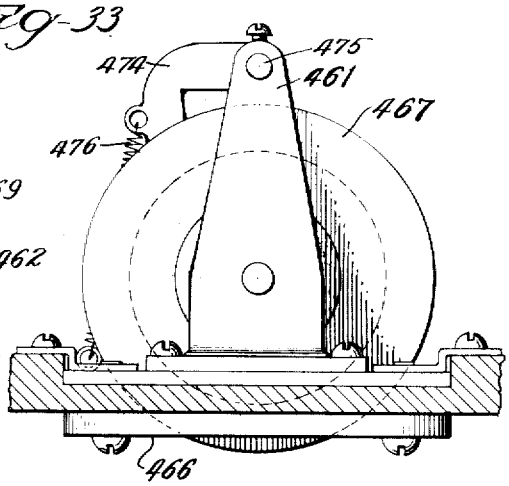

Fig. 33 is an elevational view, partly in section, of the score-recording means, as viewed from the left-hand side of Fig. 31.

As shown in the general views of Figs. 1–4, the apparatus is enclosed in a casting comprising a base 40, end walls 41 and 42, a top wall 43, a front wall 44, and a rearwardly pitched front wall section 45. The back of the casing may be closed by a suitable wood or metal panel (not shown). The front wall 44 is provided centrally with a transparent panel 46 through which the playing field may be viewed, and on either side thereof with glass panels 47 through which merchandise, such as mint rolls 48, which is dispensed from the machine, may be viewed. Bottom wall 40 is provided with trays 49 for receiving the mint rolls which are released from the vending compartments and delivered therefrom through openings 51 in the front wall 44. The rearwardly pitched front wall section 45 is provided near one end with a manually-operated score-keeping device, indicated generally by the numeral 52, and is provided near the other end with a panel 53 for viewing the indicator on the award mechanism, presently to be described. In the center of wall section 45 is located a transparent panel 54 through which may be viewed the legend-bearing reels, and immediately therebelow is provided a plate 55 bearing a card indicating the awards accompanying various combinations of the legends carried on the reels. Secured to the top wall 43 is a box-shaped housing 56 through which extends a coin chute 57. It will be understood that the several walls of the casing are secured together by bolts or other suitable connections to form a rigid unit. The front wall section 45 is made removable to permit of ready access to the interior of the casing for filling the vending compartments.

A description of the coin-controlled mechanism, the operation of which determines the moves of the various parts of the game device, will first be given, reference being had particularly to Figs. 4–7. A main base or supporting plate 58, extending between a pair of column supports 59, is provided at one end with an upright 61, in the upper end of which is journaled a reel-supporting shaft 62, the opposite end of said shaft being supported in a frame part 63 which extends upwardly from base plate 58. Three legend-displaying reels 64, 65, and 66 are mounted for free rotation on shaft 62, the hub portions of the reels consisting of sleeves which are provided, respectively, with star wheels 67, 68, and 69. The opposite ends of the sleeves of reels 64, 65, and 66 are provided, respectively, with ratchet discs 71, 72, and 73. Each reel, together with its corresponding star wheel and ratchet disc, is thus mounted for independent rotation on shaft 62. The peripheral face of each reel is provided with a legend-bearing strip which may be viewed through the panel 54, the aligned position of the legends assumed when the reels come to rest being employed, as will presently appear, to control mechanism which determines the moves of the player pieces of the game device.

Figure 3:
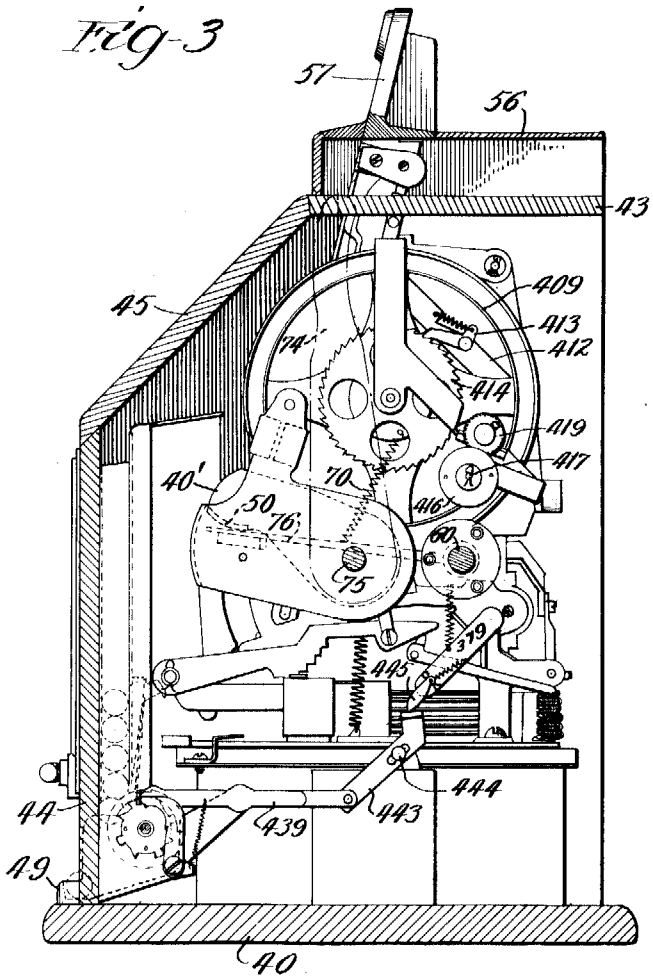
Fig. 3 is a vertical section through the machine taken on line 3—3 of Fig. 1.
Figure 2:
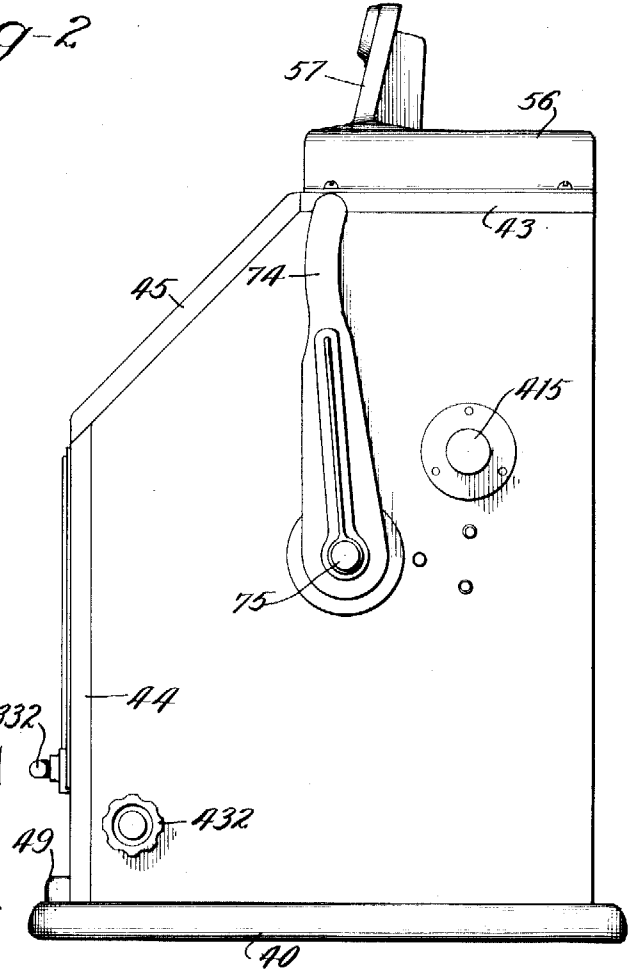
Fig. 2 is a side view of the machine, as viewed from the right in Fig. 1.
Figure 4:
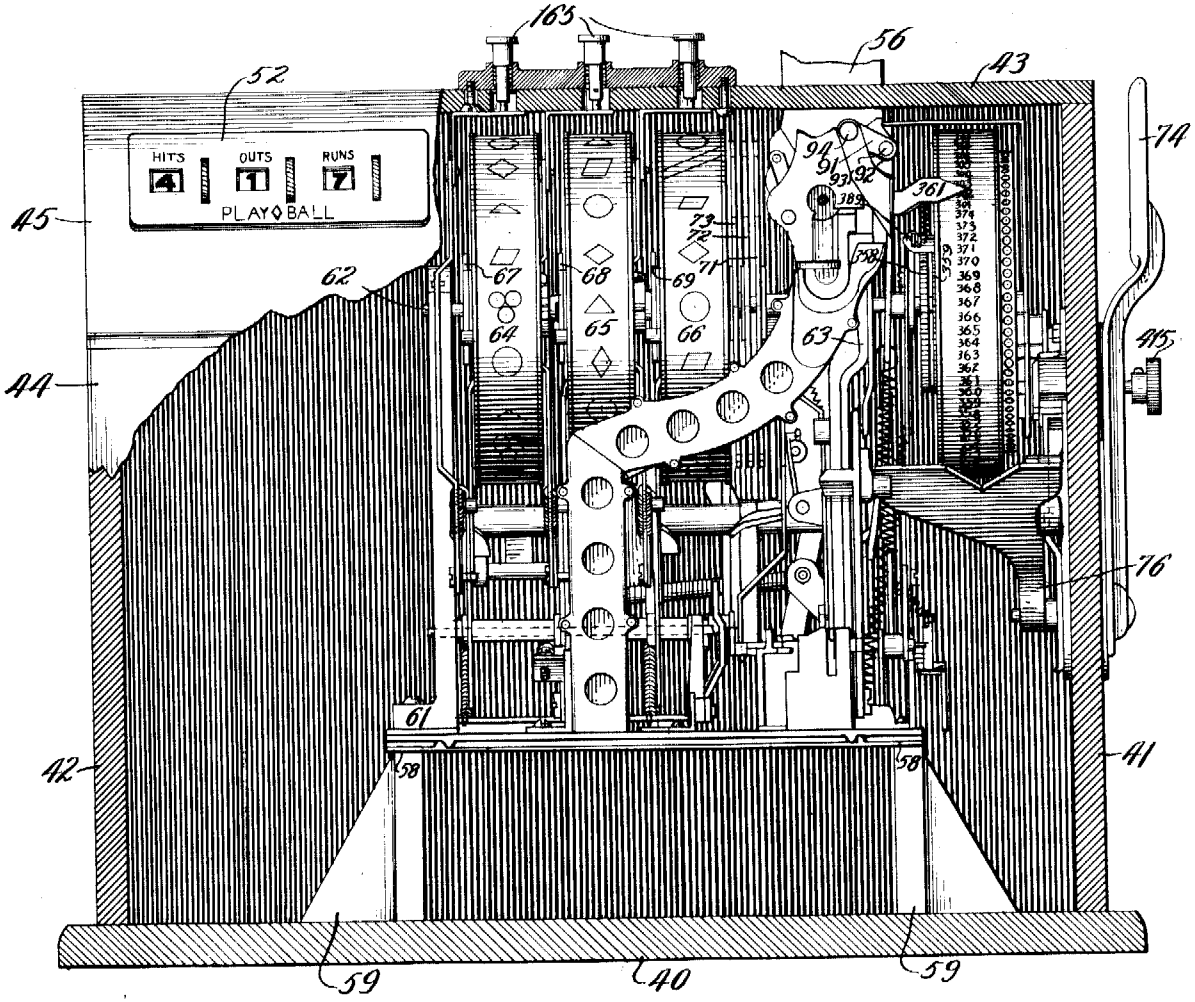
Fig. 4 is a view similar to Fig. 1 with the front portion of the casing broken away to show the internal structure.

Referring to Figs. 3 and 4, spinning of the reels is effected by first inserting a proper coin in coin chute 57 and then pulling forwardly on a main operating handle 74 which is rigidly connected through a stub shaft 75 with an apron 40′ (Fig. 3), said hub being journaled in the end wall 41 of the casing. A flange 50, projecting inwardly from the lower edge of apron 40′, rests on the forward end of an arm 76, the latter being pivoted on a stub shaft 60 carried by end wall 41. A coil spring 70 holds arm 76 against flange 50.

Figure 7:
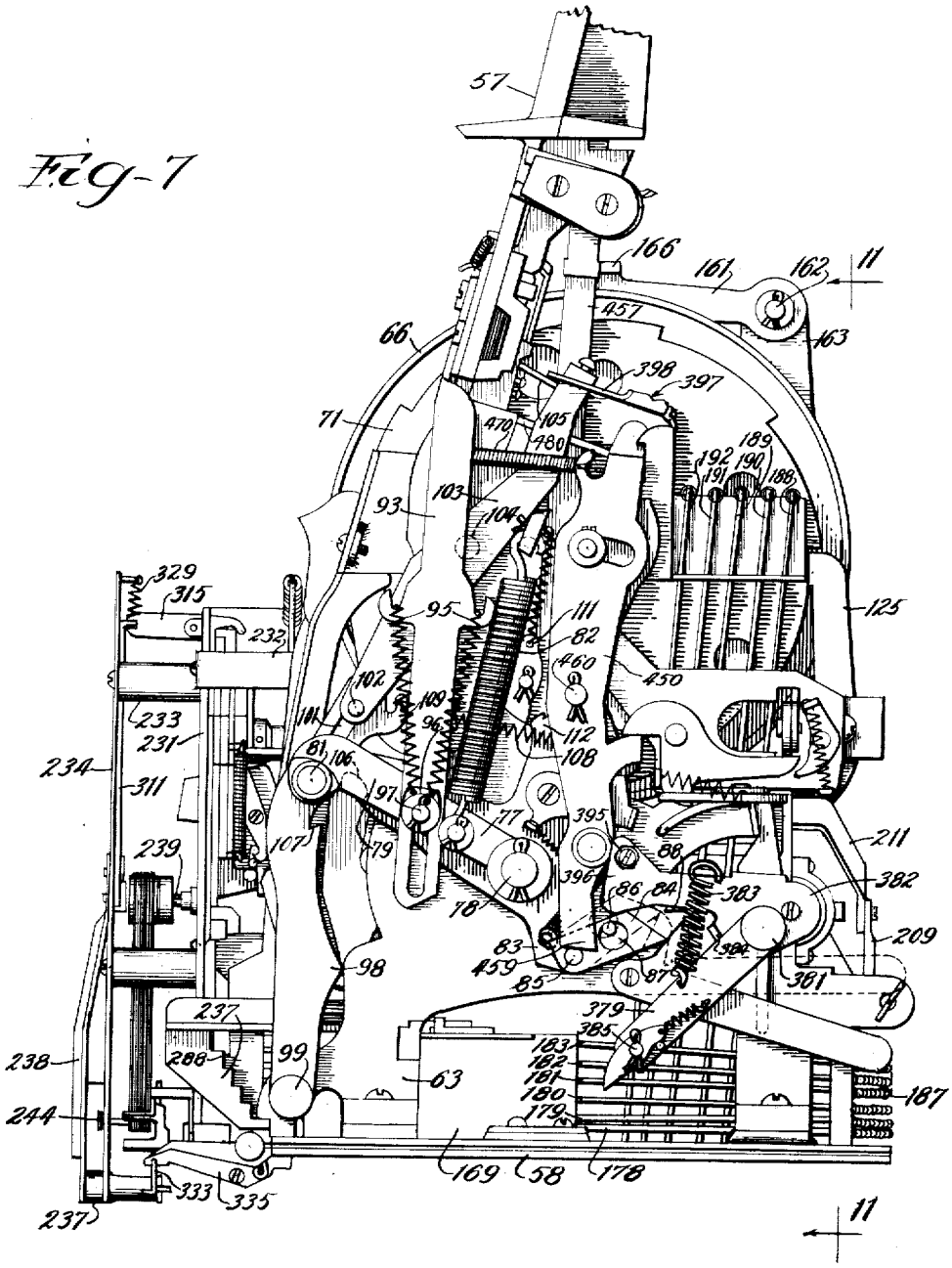
Fig. 7 is a side elevational view, with the casing removed, taken on line 7—7 of Fig. 1.

The actuating mechanism for the reels, which is operated from arm 76, is shown in Fig. 7. A lever 77, pivoted at 78 on upright 63, is provided with a forwardly projecting arm 79 which carries a laterally projecting lug 81, the latter being engaged by arm 76 when the main operating handle 74 is pulled down, this downward pull being resisted by a heavy coil spring 82 connected at one end to lever 77 and at the opposite end to a fixed point on the frame. A rearwardly extending arm 83, forming an integral part of lever 77, carries an actuating dog 84, which is pivoted at 85 to said arm 83, and which has limited swinging movement relative thereto, by reason of a pin 86 carried by arm 83 and extending through an enlarged opening 87 formed in dog 84. When lever 77 is actuated, dog 84 is raised to engage a forwardly projecting arm 88 which is rigidly supported on a main rock shaft 89 (Fig. 8), the latter extending transversely across the rear portion of the machine and having its opposite ends journaled in fixed frame parts supported from base 58.

Continuing the reference to Fig. 7, actuation of lever 77 to effect rotation of the main rock shaft 89 requires the introduction of a coin in the coin chute 57, a coin thus introduced falling into position to be engaged by a rearwardly projecting portion of a lever 91 (Fig. 4), the latter being pivoted at 92 to the coin chute housing and the rearwardly projecting portion thereof extending into the coin chute to engage the coin. A vertically disposed link 93 is pivotally connected at 94 to coin-engaging lever 91, the lower end of said link being slotted to receive a stud 97 carried by lever 77. A pair of springs 95, connected at their upper ends to link 93 and at their lower ends to a clip 96 secured to stud 97, afford a yielding connection between said link and lever 77.

Lowering of lever 77 is normally prevented by a lock bar 98, the lower end of which is pivoted at 99 to the frame and the upper end of which is slotted, as indicated at 101, to receive a pin 102 carried on the lower end of a coin trip lever 103, which is pivoted at 104 to the frame. The upper end of lever 103 carries a forwardly-projecting arm 105 which, in the normal inactive position extends flush with the rear face of the inner wall of coin chute 57. If attempt is made to lower the main actuating lever 77 without first introducing a coin, a lug 106 carried on said lever will strike a shoulder 107 on lock bar 98, said bar being urged rearwardly to bring said shoulder into engagement with lug 106 by a coil spring 108, the latter being connected at one end to the frame and at the other end to an ear 109 on the upper end of said bar. If a coin is introduced into the coin chute before pulling handle 74 forwardly, lock bar 98 is held in its forward or non-obstructing position, this being effected by the drawing of the coin downwardly in the chute by the lowering of link 93, which through lever 91 pulls the coin opposite the forward end of arm 105 to prevent forward movement of said arm and consequent turning of trip lever 103. Lever 103, being held against movement by the presence of a coin, prevents lock bar 98 from being drawn rearwardly to obstruct downward movement of lever 77.

Return movement of lever 77 under the action of spring 82 is prevented before said lever has been lowered through a complete stroke by a spring-held pawl 111 which engages a ratchet segment 112 which constitutes an integral part of lever 77. When lever 77 has been lowered far enough to allow pawl 84 to clear arm 88 on the main rock shaft, the pawl 111 will have moved completely over rack 112 and lever 77, arm 76, and handle 74 are then returned to inactive position by spring 82.

Figure 8:
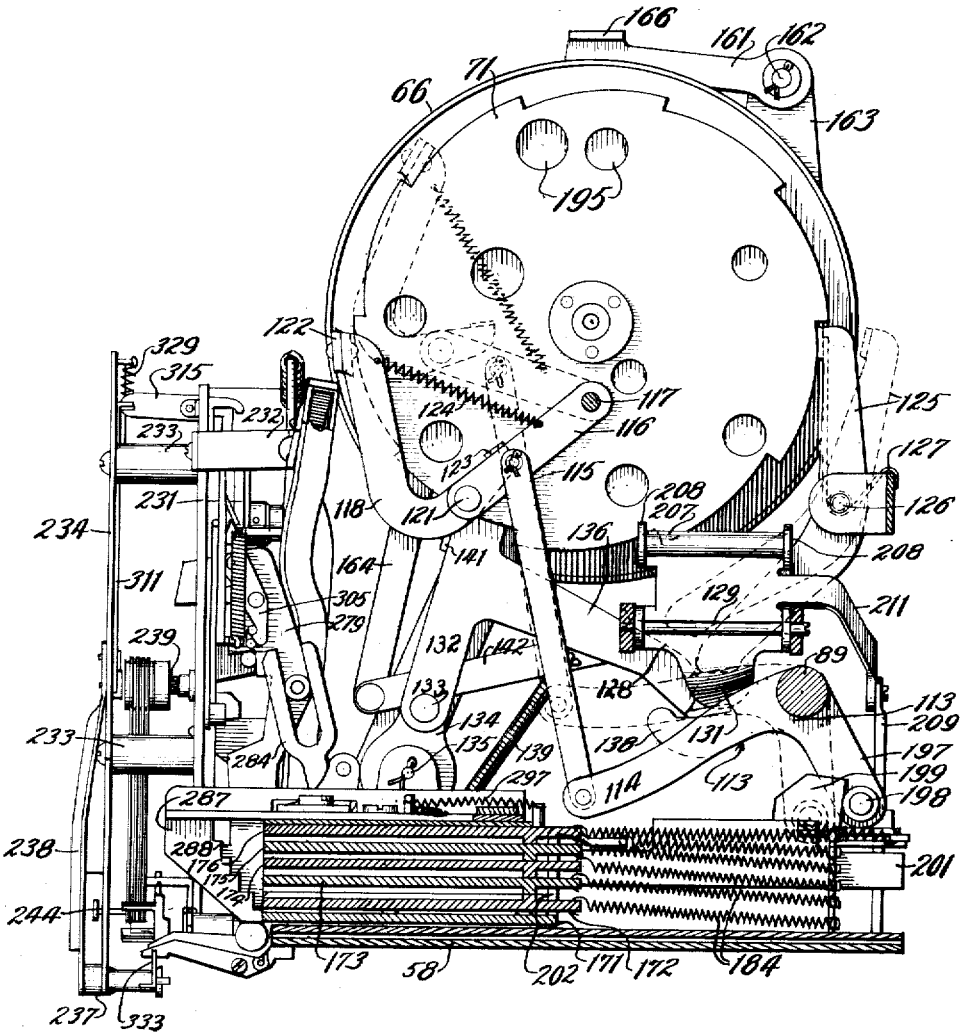
Fig. 8 is a vertical section, with the casing removed, taken on line 8—8 of Fig. 1.

The turning of rock shaft 89 spins reels 64, 65, and 66, the mechanism for accomplishing this being shown in Fig. 8. A bell crank lever 113, rigid on shaft 89, is provided with a forwardly extending arm 114 which has pivotal connection with a link 115, the latter being pivoted at its upper end to a second link 116, which in turn is pivoted at 117 to the frame. A pawl arm 118 of bell crank form is pivoted at 121 on link 116 and is provided at one end with a pawl 122 adapted to engage the teeth of ratchet discs 71, 72, and 73. The other end of pawl arm 118 carries a lug 123 which normally rests against link 116, the latter being yieldingly connected with said arm by a coil spring 124. When rock shaft 89 is actuated, pawl arm 118 is raised to the dotted position shown in Fig. 8, in which position it engages the teeth of the ratchet discs and spins the reels as soon as actuating dog 84 clears arm 88 on rock shaft 89, this spinning of the reels being effected by a quick snapping action caused by spring 124 and also by the return of rock shaft 89 under spring action toward its normal inoperative position.

The ratchet discs 71—73 are locked in their normal position of rest by a latch arm 125 which is pivoted at 126 to a fixed point on the frame, the upper end of said arm being urged forwardly against the discs by a spring 127. The lower end of arm 125 rests on an apron 128 which is pivoted on a cross-rod 129, carried by the frame, said apron being provided with a downwardly projecting cam surface 131 for engaging arm 114. When rock shaft 89 is turned to start rotation of the reels, latch arm 125 is moved to the position shown by the dotted lines in Fig. 8. When the rock shaft has returned to normal inoperative position latch arm 125 is brought back into engagement with the ratchet discs in a manner presently to be explained.

Mechanism, operated from rock shaft 89, is provided to bring the reels to rest in positions which will display various combinations of legends. Considering particularly Figs. 16–18, associated with each reel is a stop arm 132 which is pivoted at 133 to a bell crank 134, the latter being mounted for pivotal movement on a cross-rod 135. Arm 132 is provided with a rearwardly extending bracket 136, the free end of which is provided with a lip 137, which rests on a cam 138, the latter being rigidly secured to rock shaft 89. A coil spring 139, extending between bracket 136 and the frame, urges arm 132 toward the star wheel on the reel hub. In Fig. 16 rock shaft 89 is shown in the actuated position in which it will be noted that arm 132 has been moved forwardly by cam 138 to clear star wheel 67. Bell crank 134 has been moved forwardly with arm 132 by reason of the connection with the latter afforded by a laterally-extending ear 141 carried on the upper end of said bell crank. Arm 132 is releasably connected to bell crank 134 by a link 142, the rear end of which is pivotally connected at 143 to bracket 136 and the forwardly extending end portion of which is notched to engage a pin 144 carried by bell crank 134. A coil spring 145, extending between link 142 and the upper end of bell crank 134, holds arm 132 in alignment with bell crank 134 to cause these members to move in unison.

Figure 10:
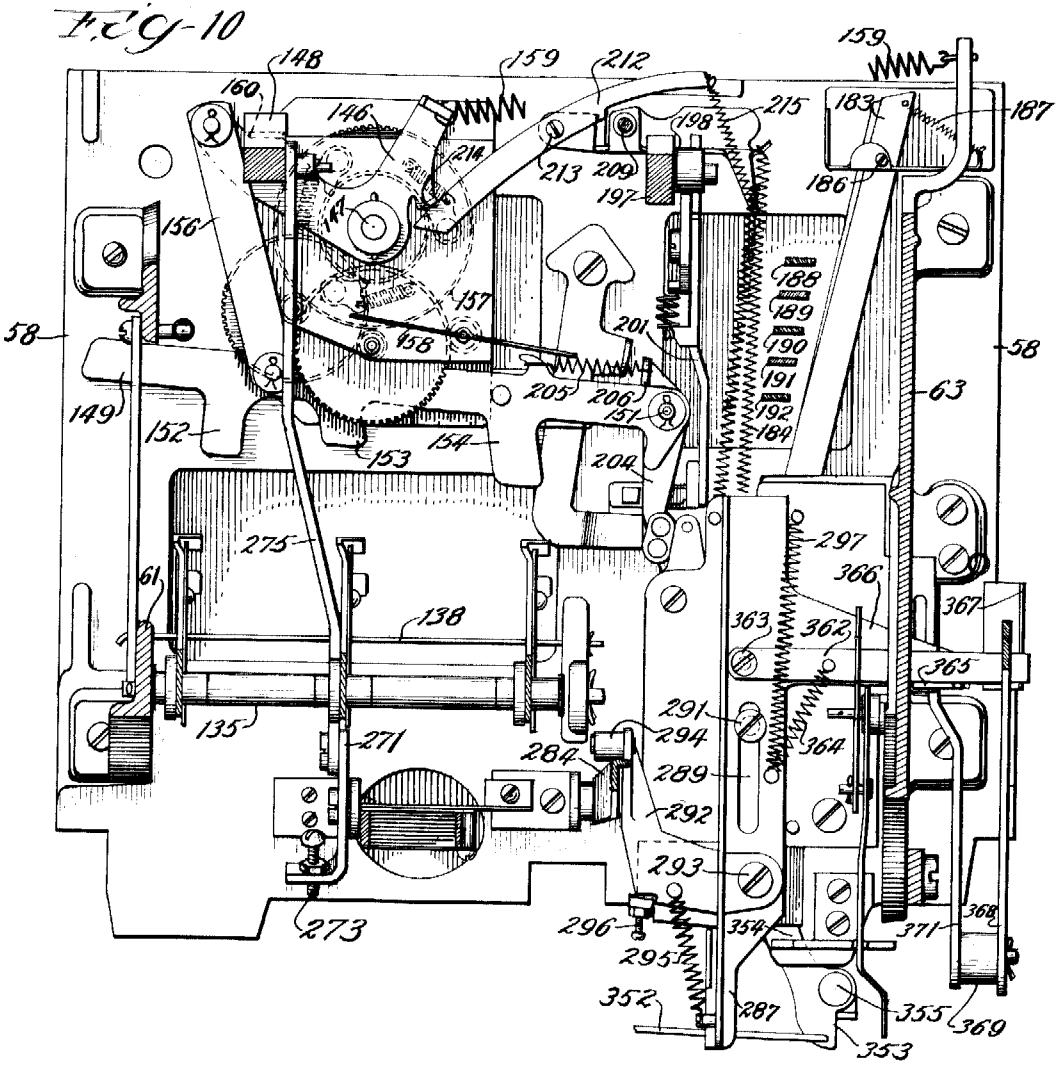
Fig. 10 is a horizontal section taken on line 10—10 of Fig. 9.

Arms 132 are held in the released position shown in Fig. 16 during the spinning of the reels, and are progressively released to stop the reels, by a clock mechanism shown in Fig. 10. This mechanism comprises: a bell crank 146, pivoted at 147 on base plate 58; an arm 148, rigid on rock shaft 89, and extending downwardly to engage bell crank 146; a clock arm 149, pivoted at 151 on base plate 58, and provided with forwardly extending projections 152, 153, and 154, for engaging the rearwardly extending arms 155 of bell cranks 134; a link 156 connecting clock arm 149 to bell crank 146; and a gear train 157, including a fan 158, for regulating the movement of clock arm 149.

When rock shaft 89 is turned to start spinning of the reels, arm 148 engages a lug 160 on bell crank 146, pivoting the latter in a counter-clockwise direction, viewing Fig. 10, against the tension of a coil spring 159 extending between crank 146 and the frame. This rotation of bell crank 146 winds up block mechanism 157 and moves clock arm 149 forwardly to position the forwardly extending projections 152—154 below arms 155, it being noted that these arms are raised during this operation by movement of stop arms 132 from engagement with the star wheels on the reel hubs. By reason of this engagement between arms 155 and clock arm projections 152—154, stop arms 132 are held in the position shown in Fig. 16 to allow the reels to spin. As clock arm 149 returns from its forward position under the action of spring 150, arms 155 fall from the clock arm projections 152—154, thereby allowing stop arms 132 to engage the star wheels 67—69 to bring the reels to rest, the different positions occupied by stop arms 132 being illustrated in Figs. 16–18. Fig. 16 represents the position of the parts when the reels are about to be spun, it being noted that clock arm 149 is in the advanced position with arms 155 resting thereon to hold stop arms 132 out of locking position. Fig. 17 represents an intermediate position for clock arm 149 in which arms 155 are about to drop therefrom. Fig. 18 shows clock arm 149 in the retracted position with stop arms 132 in engagement with star wheels 67—69. By reason of the difference in length of clock arm projections 152—154, it will be apparent that arms 155 will drop therefrom at different times to bring the reels to rest at different points.

Manually operable means is provided to permit bringing of the reels to rest in accordance with the skill of the operator, this means being illustrated in Figs. 9 and 16–18. Associated with each of the links 142 is a manually operated trip means comprising: a lever 161, pivoted at 162 on a frame part 163; a link 164, connecting the free end of lever 161 with the forward end of link 142; and a manually operable spring-pressed button 165, mounted in the top wall 43 of the casing, and having its lower end resting on a lip 166 carried by lever 161. In the position of the parts shown in Fig. 16, link 142 is in its normal position of engagement with stud 144, and hence arm 132 can not move rearwardly to engage star wheel 67 until arm 155 clears clock arm 149. However, by depressing button 165, as indicated in Fig. 17, link 142 is moved clear of stud 144. Arm 132 is then free to move into obstructive engagement with star wheel 67, so that reel 64 may be stopped before it would normally be brought to rest by the falling of arm 155 from clock arm 149. When clock arm 149 returns to normal position, as represented in Fig. 18, link 142 is again drawn against pin 144 by spring 145, this being the normal position of the parts when the reels are at rest.

By depressing the buttons 165 at the proper time, the operator may exercise his skill in bringing the reels to such positions of rest as will display favorable combinations of legends. In the event that the buttons 165 are not operated, the reels will be brought to rest in the progressive sequence determined by the relative length of clock arm projections 152—154.

Means is provided for controlling the moves of the player pieces of the game apparatus in accordance with the positions of rest assumed by the reels. This mechanism is best shown in Figs. 8, and 11–15. Mounted in a box-shaped housing 169 (Fig. 13), supported on base plate 53, is a stack of horizontally disposed slides 171—176, the rear ends of which are provided with shoulders 177 which engage, respectively, the forward ends of a corresponding series of locking levers 178—183, said slides being urged rearwardly against the forward ends of said locking levers by coil springs 184 secured at their forward ends to lips 185 on the slides and at their rear ends to the frame. Locking levers 178—183 are pivoted on a shaft 186 (Fig. 14) carried by the frame and are yieldingly held in locking engagement with the slides by coil springs 187.

Slides 171—176 are selectively released by levers 178—183 in accordance with the positions of rest assumed by the reels. This is effected by a series of locking dogs 188—192 (Fig. 11), pivoted at 193 on the frame and provided at their upper ends with horizontally disposed fingers 194, the free ends of which normally rest against the outer ratchet disc 71. As shown in Fig. 12, discs 71—73 are provided with perforations 195 into which fingers 194 are urged by springs 196 when the reels assume such positions of rest as to bring the perforations into registration with said fingers. The lower ends of locking dogs 188—192 are notched, as shown in Fig. 11, to permit of the selective releasing of levers 178—183. Dog 188 is arranged to release the lowermost lever 178 when the positions of the reels are such as to permit it to enter perforations in the two outer discs 71 and 72. When it enters perforations in all three discs 71, 72, and 73, it releases both levers 178 and 179. Lever 178, it will be noted, is positioned slightly out of line with lever 179 to permit of this actuation of both levers from dog 188. The four remaining dogs 189—192 are each arranged to respectively release levers 180—183. It will be apparent, therefore, that retraction of slides 171—176 is thus controlled in accordance with the positions of rest of the reels, it being noted that the notches in the lower end of dogs 188—192 are so arranged that when one particular slide of the stack is retracted, all of the slides positioned below that particular one will also be retracted.

Slides 171—176 are returned to their advanced position preparatory to the spinning of the reels by an arm 197 (Fig. 8) carried by rock shaft 89 and provided at its lower end with a lug 198 which engages a bracket 199 projecting upwardly from a horizontally disposed slide return bar 201. The forward end of bar 201 engages an upturned arm portion 202 carried by the bottom slide 171, said arm portion resting against a shoulder portion 203 (Fig. 14) formed in each of the slides 172—176. When rock shaft 89 is turned to spin the reels, bar 201 is shoved forwardly by arm 197 to return such of the slides as have been retracted in the previous play to their normally advanced position where they are locked by levers 178—183. An additional lock arm 204 (Figs. 10 and 14) is provided to hold the slides in advanced position. This arm is pivoted at 151 on base plate 53 and is yieldingly connected to clock arm 149 by a spring 205 extending between the clock arm and a stop lug 206 carried by arm 204. When clock arm 149 moves from its advanced position to its normally retracted position, lock arm 204 is shifted to the position shown by the dotted lines in Fig. 14, thereby moving the forward end of said arm free from arm portion 202 of the lowermost slide to permit retraction of such of the slides as are subsequently released by levers 178—183.

Referring to Figs. 8 and 11, locking dogs 188—192 are held in non-obstructing position relative to the ratchet discs by a rest 207 secured at its opposite ends in ears 208 which are struck from apron 128. When rock shaft 89 is turned to start spinning of the reels, arm 114 pivots apron 128 from the position shown by the solid lines in Fig. 11 to that shown by the dotted lines to move rest 207 against locking dogs 188—192, the latter being thus withdrawn from ratchet discs 71—73 to asume the position shown by the solid lines in Fig. 11.

Figure 9:
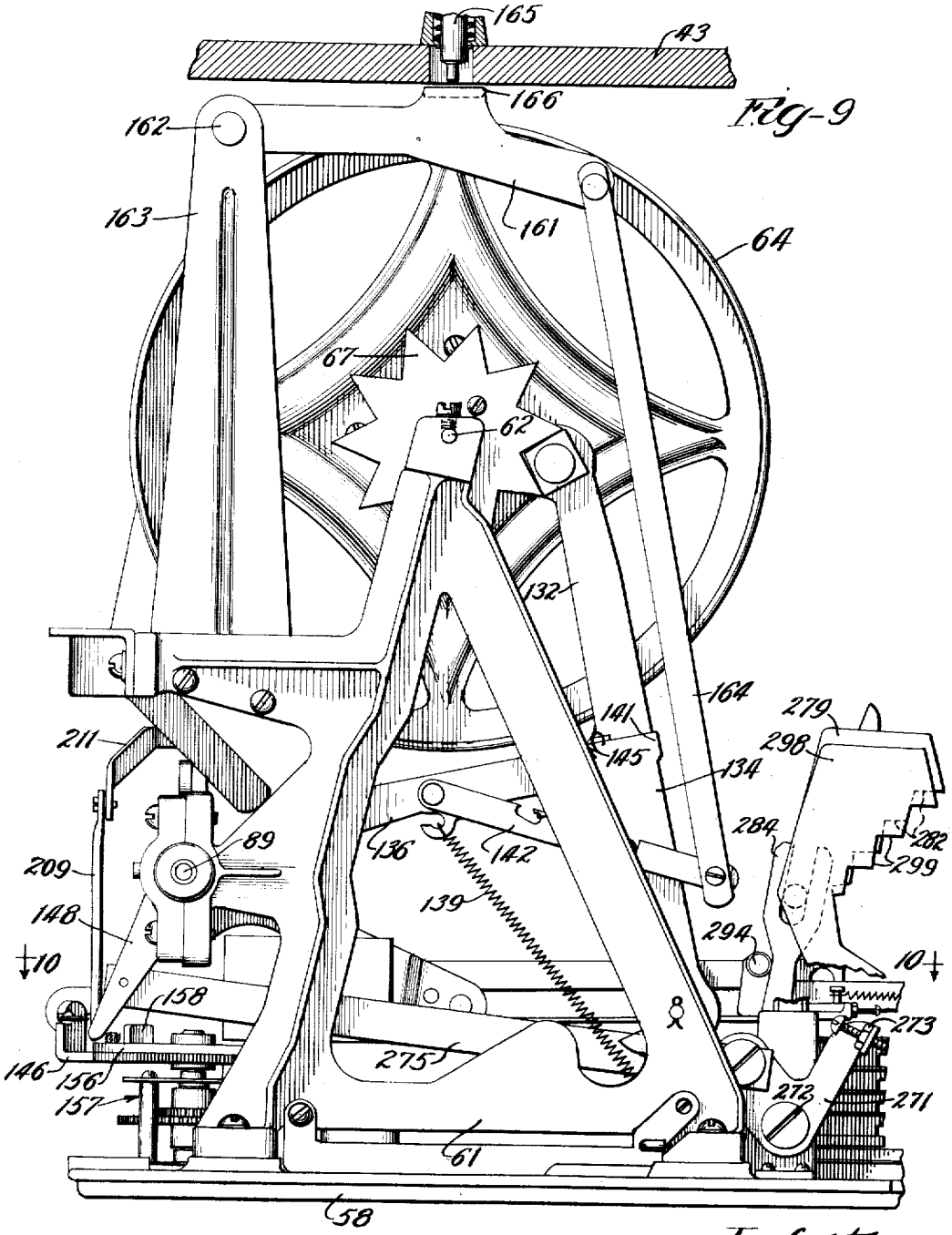
Fig. 9 is a broken vertical section taken on line 9—9 of Fig. 1.

Rest 207 is released by the clock mechanism to permit the locking dogs to fall against ratchet discs 71—73, the means provided for this purpose being shown in Figs. 8, 9, and 10. A vertically disposed rod 209 is connected at its upper end to a laterally extending bracket 211 carried by apron 128. When apron 128 is raised to hold locking dogs 188—192 free from the ratchet discs, rod 209 is raised and rests at its lower end on a lever 212 which is pivoted at 213 to the frame. One end of lever 212 engages a lug 214 on bell crank 146, this end of the lever being held in yielding engagement with said lug by a coil spring 215 connected at one end to lever 212 and at the other end to the frame. When rock shaft 89 is actuated, bell crank 146 is pivoted in a counter-clockwise direction, viewing Fig. 10, thereby allowing lever 212 to be moved below rod 209, which during this interval has been raised so that its lower end will clear said lever. As bell crank 146 returns to inoperative position under the control of the clock mechanism, lever 212 is gradually moved until it clears the lower end of rod 209, whereupon it falls under its own weight, thereby moving rest 207 clear of locking dogs 188—192, the latter being then free to fall into the perforations in ratchet discs 71—72 to stop the reels.

It is believed that a brief statement of the operation of the coin-operated reel mechanism, which controls the position of slides 171—176, will aid in giving a clearer understanding of the mechanism which has been described up to this point. Upon depositing a coin in coin chute 57 and pulling down operating handle 74, lever 77 (Fig. 7) will be lowered, the lug 91 thereon being engaged by arm 73 which is actuated from handle 74 through apron 40 (Fig. 3). As lever 77 is lowered link 93 operates through lever 91 to pull the coin in the chute opposite the front end of arm 105 carried on the upper end of coin-trip lever 103, the latter being thus held through the medium of the coin against pivotal movement and in turn holding lock arm 98 forward to prevent shoulder 107 from moving into engagement with lug 106 on lever 77. A complete downward stroke of lever 77 is thus permitted and rock shaft 89 is turned by engagement of dog 84 with arm 88 rigid on said rock shaft. As rock shaft 89 is turned, the reels are started spinning by the lifting of pawl arm 113 (Fig. 5) into engagement with the teeth on ratchet discs 71—73. As arm 114 is raised to spin the reels through pawl arm 118 it engages apron 126 to move lock arm 125 rearwardly to clear the teeth of the ratchet discs. Raising of apron 128 also moves rest 207 against the vertical stems of locking dogs 188—192 to remove any of the dogs which have fallen into the apertures in the ratchet discs in the previous operation of the machine. Raising of apron 128 also raises rod 209 so that its lower end rests on link 212 (Fig. 10). As rock shaft 89 is turned to position the reel spinning devices, cam 138 which is rigid with rock shaft 89 (Fig. 16), is raised to move stop arms 132 clear of star wheels 67—69 carried by the reel hubs. At the same time clock arm 149 (Fig. 10) is moved forwardly by arm 148 on the main rock shaft to position the forwardly extending projections 152—154 below the rearwardly extending arms 155 which form the foot portions of bell cranks 134. This advance movement of the clock arm allows lever 212 to move beneath the lower end of the vertically disposed rod 209. As rock shaft 89 is advanced preparatory to the spinning of the reels, such of the slides 171—176 as have been retracted in the previous operation of the machine are advanced to their forward position by the forward movement of bar 201 which is actuated from arm 197 carried on rock shaft 89 (Figs. 3 and 10). After the slides have been returned to their forward position, they are locked against return movement by levers 178—183 and also by lock arm 204. As soon as dog 84 slips from the forward end of arm 88 the reels start to spin and rock shaft 89 starts to return under spring action to its inactive position. As clock arm 149 moves rearwardly the manually operated buttons 165 may be manipulated by the operator to release stop arms 132 from bell cranks 134 (Figs. 16–18), thus permitting the reels to be stopped in accordance with the skill of the operator. As the clock mechanism returns to inoperative position, rest 207 is moved clear of locking dogs 188—192 by the falling of rod 209 from lever 212, said locking dogs being thus rendered free to fall into such of the perforations of ratchet discs 71—73 as may finally come to rest opposite the end portions 194. Such of the levers 178—183 as are thus actuated by dogs 188—192 allow the corresponding slides 171—176 to be retracted by the action of springs 184, it being understood that lock arm 204 is released from the slides by the return of clock arm 149 to inoperative position. As soon as rod 209 (Fig. 8) is allowed to fall from lever 212, latch arm 125 is returned into locking engagement with the ratchet discs by spring 127.

The game apparatus, the playing of which is determined by the positions of slides 171—176, will now be described, reference first being had to Figs. 1 and 6–8. A main support plate 231, secured by brackets 232 to the frame, carries a group of forwardly projecting posts 233 to which is secured a plate 234 which forms the outer portion of the playing field. The central portion of the field consists of a circular plate 235 which is positioned in a circular opening in plate 234 of slightly greater diameter to provide between the plates an annular path 236 (Fig. 1) in which the player pieces move. Plate 234 is provided at its lower edge with a boss 237 which carries a vertically disposed arm 238 to the upper end of which is rigidly secured plate 235. As shown in Fig. 1, plates 234 and 235 are marked to indicate the bases and base lines of a baseball field.

The player pieces which move over the ball diamond are best shown in Figs. 21–24, 26, and 27. A stub shaft 239 is mounted for free rotation in a bearing 241 carried in plate 231, the rear end of said shaft having rigidly secured thereto a gear wheel 242 which is driven from a clock mechanism indicated generally by the numeral 243 (Fig. 20). Player pieces 244—245—246—247, which may be in the form of circular tabs, are secured respectively to the free ends of arms 248, 249, 250 and 251, the free ends of said arms being bent laterally to extend through the annular path 236, the player pieces being disposed adjacent the front surfaces of plates 234 and 235 which form the playing field. Arms 248—251 are frictionally secured to stub shaft 239, normally moving with said shaft, but are free for separate movement thereon to permit successive movement of the player pieces as presently to be explained. The forward end of stub shaft 239 is squared, as shown in Fig. 21. The upper end of each of the arms 248—251 is provided, as shown in Fig. 22, with a circular opening 252 of a diameter slightly greater than the diagonal width of the squared portion of shaft 239. Between each of the arms is placed a packing washer 253, the washers and the ends of the arms being clamped to the squared portion of shaft 239 by a screw 259, and a spring plate 254, and an adjustable collar 255 being carried by the shaft adjacent the innermost arm to yieldingly press the arms against the washers. The player pieces 244–247 are thus mounted on the playing field so as to be freely movable in the annular path 236 to simulate the movement of runners over a baseball diamond. The friction engagement between the player carrying arms and shaft 239 allows one or all of the player pieces to be moved as the shaft rotates.

The clock mechanism 243, which controls the turning of shaft 239, is shown in Figs. 20 and 23. Gear wheel 242 on shaft 239 connects through an ordinary clock mechanism, including gear wheels 256, 257 and 258, with a regulator vane 259. The wind-up mechanism for these clock gears comprises: a bell crank 261 rigid on a shaft 262 upon which gear wheel 258 is loosely mounted; a bar 263, pivotally connected at 264 to bell crank 261, and having vertical sliding movement relative to plate 231 through screw and slot connections 265; a wind-up lever 266, pivoted at 267 to plate 231, and provided at its free end with a spring-held dog 268 which engages a rearwardly projecting bracket 269 carried on the lower end of bar 263; a bell crank 271 (Fig. 9), fulcrumed at 272 to the frame, the forward arm of said crank being provided with a set screw 273 for engaging a rearwardly projecting flange 274 formed on wind-up lever 266; and a link 275 connecting the rearwardly extending arm of bell crank 271 to arm 148 carried by rock shaft 89.

Bell crank 261 is connected to gear wheel 258 through a pair of spring-held pawls 276 carried by said wheel and adapted to be driven from shaft 262 through ratchet wheel 277 which is rigid on said shaft. A heavy coil spring 278 extending between one arm of bell crank 261 and plate 231 normally holds bar 263 in the raised position shown in Fig. 20. When rock shaft 89 is turned in the actuation of the coin-controlled mechanism, arm 148 moves forwardly to pull down wind-up lever 266 and bar 263 against the tension of spring 278, this wind-up being effected by reason of the engagement of set screw 273 with flange 274 on wind-up lever 266.

Assuming bar 263 is in the lowered position assumed by it when the clock mechanism 243 is wound up, it will be apparent that the extent to which this bar is allowed to return to its normally-raised position will determine the amount of rotation imparted to shaft 239, and hence, the extent of movement of the player pieces over the playing field.

The return or upward movement of bar 263 is made to depend upon the positions of slides 171—176. Since the positions of these slides in turn depend upon the positions of rest assumed by the reels, it follows that the movement of the player pieces is made to depend directly upon the positions of rest assumed by the reels.

The means for controlling the return movement of bar 263 from the coin-controlled slides 171—176 is shown in Figs. 8, 10, and 24. An escapement bar 279, pivoted at 281 on the frame, is provided with four forwardly-projecting shoulders or steps 282, which engage a pin 283 carried by bar 263. Each of the steps 282 allows sufficient movement of bar 263 to advance a player piece one base. For example, when pin 283 moves upwardly from the lowermost or fourth of the steps 282 to the third step, a piece will be advanced one base. Similarly, when said pin 283 moves from the lowermost of said steps to the second step a piece will be advanced two bases, corresponding to a two-base hit. If pin 283 moves vertically the height of all four of the steps 282 the piece is allowed to advance four bases, representing a home run.

Means is provided for positioning escapement member 279 relative to pin 283 according to the positions assumed by slides 171—176 of the coin-controlled mechanism. In the embodiment shown, this mechanism comprises: a lever 284, pivoted at 285 on the frame, the upper end of said lever being bifurcated to engage a lug 286 carried by escapement bar 279; a slide-return bar 287 (Fig. 8), provided with a series of five rearwardly projecting steps 288 for engaging the forward ends of slides 171—176, said slide bar being provided in its upper face with a slot 289 (Fig. 10) through which extends a pin 291 carried on the slide-supporting housing, said pin and slot connection permitting limited horizontal movement of bar 287 relative to the frame; and a lever 292, pivoted at 293 on slide bar 287, the free end of said lever being provided with a laterally extending lug 294 which engages the rear edge of lever 284.

A coil spring 295 (Fig. 10), extending between lever 292 and the forward end of slide bar 287, provides a yielding connection between these parts, a set screw 296 being provided on bar 287 to afford an adjustable stop for said lever 292.

It will be apparent that the position of escapement bar 279 relative to pin 283 is directly dependent upon the position of slides 171—176. When the machine is operated by pulling down on handle 74, the slides are all returned to their normally advanced position, as shown in Fig. 8. In this position slide bar 287 is fully advanced and likewise escapement bar 279 is moved forwardly to the dotted line position shown in Fig. 24, with pin 283 resting on the lowermost of the steps 282, said pin being lowered to this position by the wind-up of clock mechanism 243. Assuming now that the reels have assumed such positions of rest as to permit retraction of the two lowermost slides 171 and 172. Slide bar 287 will be retracted by a spring 297, extending between said bar and the slide housing, to bring the step 288 which is third from the top against slide 173. In moving to this position slide bar 287 retracts escapement bar 279 sufficiently to allow pin 283 to move vertically the distance of the two lowermost steps 282, this movement corresponding to a two-base hit. In the embodiment shown, the slides 171, 172, and 173 are arranged to correspond respectively to a one, two, and three-base hit. The three uppermost slides 174, 175, and 176 are each arranged to give a four-base hit, or home run. Although each of the top three slides gives a home run, they are arranged to give the operator a different number of free plays, as will presently be explained in the description of the award mechanism.

Means is provided which operates in conjunction with escapement bar 279 to release the player pieces at the bases to permit of their advance to the next base when a winning combination on the reels is obtained. This mechanism is shown in Figs. 24 and 26. A bar 298, provided with a series of steps 29 having the same shape as steps 282 on bar 279, is positioned immediately adjacent said bar 279, being slidably connected thereto at its lower end by a pin 301 carried on bar 279 which extends into a slot 302 on bar 298. At its upper end bar 298 is provided with a pin 303 which projects through a slot 304 in bar 279. A latch 305, carried by bar 279, hooks over pin 303 when bars 279 and 298 are tilted forwardly to the position shown by the dotted lines in Fig. 24. This forward tilting movement is effected through bifurcated arm 284 when the machine is preliminarily actuated for a play, bar 263 carrying pin 283 being at the same time lowered to engage one of the steps 299, thereby raising bar 298 until pin 303 is hooked by latch 305. A spring 306 yieldingly holds latch 305 against pin 303.

Continuing the reference to Fig. 24, as bars 279 and 298 move rearwardly from the position shown by the dotted lines to the position shown by the solid lines, the inner bar 298 is released from the outer bar 279 by the tripping of latch 305, this being effected by a spring-held pawl 307 carried by said latch and positioned to strike an arm 308 projecting rearwardly from plate 231. The purpose of thus separating bar 298 from bar 279 is to actuate a lever system which obstructs advance of the player pieces as they arrive at their respective bases. This system of levers which is actuated by the separation of bar 298 from bar 279 is shown in Figs. 20, 24, and 26. It comprises: a pair of release arms 309 and 311, pivoted at 312 and 313, respectively, to the rear face of plate 234, said bars being pivotally connected to one another at 314; a lever 315, fulcrumed at 316 on an arm carried by plate 231, the forward end of said lever being bifurcated to engage a lip 317 projecting rearwardly from release arm 309; a lever 318, pivoted at 319 on plate 231, and having its free end positioned to engage the rear end of lever 315; a second lever 321, pivoted at 322 on plate 231, and having its free end positioned to rest on a cam projection 323 on bar 298; and a pair of links 324 and 325 pivoted, respectively, to levers 318 and 321 and yieldingly connected to one another by a coil spring 326.

When bars 279 and 298 are in registration with one another, which is the position they assume when pivoted forwardly at the beginning of each play, cam projection 323 will engage lever 321 to hold lever 315 in its lowered position, in which position it holds arms 309 and 311 in the obstructing position shown by the dotted lines in Fig. 26, it being noted that in this position the free ends of said arms rest in the annular path 236 to hold the pieces at first and third bases. The piece at second base is held against displacement by a lug 327 carried by arm 311. The lower ends of the release arms have a pin and slot connection with plate 234, as indicated at 328. Before bars 279 and 298 move rearwardly the player pieces at first, second and third bases are thus held against advance movement. As these bars pivot rearwardly the inner bar 263 is released from bar 279 by the striking of pawl 307 against arm 308. Arm 298 then falls under its own weight to lower cam projection 323 and link 321, this lowering serving to raise the forward end of lever 315 which in turn moves release arms 309 and 311 to the non-obstructing position shown by the solid lines in Fig. 26. A coil spring 329 connected with arms 311 serves to urge link 321 against cam projection 323.

The separation of bar 298 from bar 279 thus releases the player pieces on the field allowing them to advance as soon as bar 263 carrying pin 283 falls off from one of the steps 282. As the player pieces approach the limit of their advance movement, as determined by the control slides 171—176, pin 283 strikes one of the steps on bar 298 to again bring said bar into registration with bar 279, in which position release arms 309 and 311 are again positioned to obstruct further advance of the pieces.

As shown in Fig. 24, a manually operable device is provided to clear the field preparatory to starting a new game. This mechanism comprises: a shaft 331 which projects through boss 237 carried on the lower edge of plate 234, said shaft being provided on the front of the machine with an operating handle 332 (Fig. 1); a cam 333 secured to the inner end of shaft 331; an arm 334 extending forwardly from the lower end of bar 279; and a trip lever 335, pivoted to the lower end of bar 279, and connected at one end through a wire 336 with latch 305. As handle 332 is turned in a counter-clockwise direction, viewing Fig. 1, cam 333 will engage arm 334 to pivot bar 279 to the position shown by the solid lines in Fig. 24, in which position bar 263 carrying pin 283 is free to move upwardly the full distance, the rotation of shaft 239 thus effected serving to return the player pieces to the home base. The pieces at the bases are released for this movement by the tripping of latch 305 through cam 333 and lever 335, bar 298 being thus separated from bar 279 to move release arms 309 and 311 to non-obstructing position as previously described.

Mechanism is provided for releasing the pieces one at a time from the home base each time a winning combination on the reels is obtained. Referring to Figs. 23–26, a bell crank 337, fulcrumed at 338 on plate 231, is provided with an arm 339, the end of which is bent forwardly to form a stop 341 for engaging projections 340 (Fig. 27) on the lower ends of the arms carrying the player pieces. Pivoted at 342 to arm 339 is a lever 343, the end of which is similarly bent forward to provide a stop 334. Arm 339 and lever 343 are connected by a spring 345, a stop 346 being provided on plate 231 to limit the upward movement of lever 343. A slide bar 347, having pin and slot connections at 348 with plate 231, is provided at one end with a lug 349 which rests against one arm of bell crank 337, a yielding connection being provided between these parts by a spring 351.

A rod 352 (Fig. 10) connects one end of bar 347 to a lever 353 provided with a rearwardly projecting arm 354 which engages the front end of the lowermost slide 171, said lever 353 being pivoted at 355 to the frame. As slide 171 is moved forward preparatory to the spinning of the reels a player piece at home base is released from stop 341 and is moved against stop 344, this being effected by the movement of the parts from the position shown by the solid lines in Fig. 25 to the position shown by the dotted lines in said figure, bar 347 being drawn to the right to effect this operation through rod 352 and lever 353. If a winning combination is obtained, the lowermost slide 171 will be retracted and the piece held by stop 344 will be released as arm 339 and lever 343 are returned to the position shown by solid lines in Fig. 25 under the action of spring 351. One runner is thus released from the home base for each winning combination, the other runners being held at said base until the machine is again operated and a winning combination is obtained.

It is believed that a clearer understanding of the operations of the various parts of the game device will be obtained by a brief statement of the action of the several parts. Assuming that the previous operation of the machine has scored a home run, thereby returning all the player pieces 244—247 to the home base, as shown in Fig. 24, upon the placing of a coin in coin chute 57 and actuating rock shaft 89, clock mechanism 243 (Fig. 20) is wound up by the lowering of bar 263, this being effected from rock shaft 89 through arm 143 (Fig. 9), link 275, bell crank 271, and lever 266. At the same time that clock mechanism 243 is wound up, such of the slides 171—176 as have been retracted in the previous play, are returned to the advanced position, shown in Fig. 8, this return also moving slide bar 287 to its advanced position. Slide bar 287, in advancing under the action of the control slides, moves escapement bar 279 and also bar 298 forwardly from the position shown by the solid lines in Fig. 24 to the position shown by the dotted lines in said figure, this being effected through lever 292 and arm 288. Inasmuch as bar 263 has been lowered by the wind-up of clock mechanism 243 during this period, pin 283 will rest on the lowermost of the steps 282, the seating of said pin on this step moving bar 298 into registration with escapement bar 279, the latter movement serving to move release arms 309 and 311 (Fig. 26) into obstructing position on the diamond. The forward movement of the lowermost slide 171 actuates lever 353 (Fig. 10) to release one piece at the home base from stop 341, allowing this piece to rest slightly in advance of the others against stop 344 (Fig. 25). The piece which is thus freed is urged forwardly against stop 344 by clock mechanism 243, it being noted that in the initial wind-up of the latter pin 283 is lowered somewhat below the lowermost of the shoulders 282, bar 279 being cut away, as indicated at 356, to allow for sufficient raising of pin 283 to advance the released piece from stop 341 to stop 344. Upon release of one or more of slides 171—176, slide bar 287 is pulled rearwardly by spring 297 until one of the shoulders 283 engages the forward edge of the lowermost slide which has not been retracted. The amount of return permitted of slide bar 287 thus depends on the number of slides which are released. As previously stated, the three lowermost slides correspond to one, two, and three-base hits, escapement bar 279 being pivoted rearwardly by the release of these slides to allow sufficient movement of shaft 239 to advance the pieces the required amounts. When one or more of the three uppermost slides is retracted, a home run is obtained, bar 279 being pivoted to its extreme rear position in this case. As soon as escapement bar 279 is retracted by the release of a slide, shaft 239 is turned to move the pieces over the diamond, this being effected by the dropping of pin 283 from one of the steps on bar 279 to allow the clock mechanism to unwind. As bar 279 is pulled rearwardly, dog 307 is actuated to release bar 298 which moves arms 309 and 311 (Fig. 26) to non-obstructing position. The player piece at home base which rests against stop 344 (Fig. 25) is now released by the retraction of the lowermost slide 171 and advanced an amount determined by the position of escapement bar 279, being held at the designated bases by the return of arms 309 and 311 to obstructing position, this return being effected as the runner arrives at the base by movement of bar 298 back into registration with bar 279. If a home run is scored, clock mechanism 243 unwinds the full amount, raising pin 283 to the position shown in Fig. 24, in which position all of the player pieces will be cleared from the field.

An award mechanism is provided which operates to automatically allow one or more free operations of the machine depending upon the success experienced by the operator in the previous play. This award mechanism is also in the present embodiment designed to indicate the score attained by the operator which approximates the "batting average" attained by the average baseball player.

Referring to Figs. 3, 4, and 19, a score wheel 357 is mounted for free rotation on reel shaft 62. Immediately adjacent the inner hub portion of this wheel, and rigid on shaft 62, are a pair of oppositely toothed ratchet wheels 358 and 359, the latter being in close frictional engagement with the hub portion of wheel 357 so that normally the two ratchet wheels and wheel 357 turn together as a unit with shaft 62. To the periphery of wheel 357 is secured a score tape or strip which is divided into spaces corresponding to numbers 300—375, this interval being selected in the present embodiment inasmuch as it falls in the approximate range of the batting average of the average baseball player. The numeral 300, which represents the starting position normally lies opposite a pointer 361 (Fig. 4) which may be viewed from the exterior through panel 53, the number on reel 357 appearing opposite this pointer at any particular time being designed to indicate to the operator the score which he has attained.

Referring to Figs. 10 and 19, means is provided for advancing wheel 357 each time a winning play is scored on the ball diamond. Slide bar 287 carries a lever 362 which is fulcrumed at 363 on said bar. A coil spring 364 urges lever 362 forwardly against a stop 365 carried by a lateral arm projection 366 which constitutes an integral part of bar 287. The free end of lever 362 rests on the upper edge of a bracket 367 secured to the frame, the portion of said lever near the free end thereof affording a support for a stepped arm 368 which is pivoted at 369 on a bracket 371 secured to the frame. Arm 368 is provided with six steps 372 corresponding to the six control slides 171—176. The position in which arm 368 is supported depends upon the position of lever 362, which in turn depends upon the position of slide bar 287 and the position of the control slides 171—176. For example, if the two lowermost slides 171 and 172 are retracted in the operation of the coin mechanism, bar 287 will be returned until it rests against slide 173, which, as previously explained, corresponds to a two-base hit. In returning to this position arm 287 moves lever 362 rearwardly until the third of the steps 372 rests thereon, arm 368 in this operation being dropped the distance of two steps.

Continuing the reference to Fig. 19, the advance of wheel 357 is controlled by the movements of arm 368, the means for this purpose comprising: an arm 373, mounted for free rotation on shaft 62; a pawl 374, carried on the outer end of arm 373 and normally held in engagement with the teeth of ratchet wheel 358 by a spring 375; and a link 376 connected at its lower end to arm 368 and at its upper end to arm 373. It will be evident that the advance rotation imparted to wheel 357 by pawl 374 will depend upon the fall permitted of arm 368. In the embodiment shown these advances of wheel 357 for each of the six steps on bar 368 are, in order, 2, 4, 8, 12, 16, and 20, steps 372 being shaped to give these displacements of said wheel. For example if the three lowermost slides 171—173 are retracted to give a three-base hit, arm 368 will fall the distance of three steps, thereby advancing wheel 357 eight spaces. Similarly the three uppermost slides 174—176, although each arranged to give a home run on the playing field, give different displacements of wheel 357, slide 174 recording a score of 12, slide 175 recording a score of 16, and slide 176 recording a score of 20, this being the maximum score which can be made on one play. A coil spring 377 urges arm 368 against lever 362. A second pawl 378, positioned on the outer end of arm 373, engages ratchet wheel 359 to prevent overrun of wheel 357 when it is advanced by pawl 374.

Arm 373 is raised to return pawl 374 to its initial driving position on ratchet 358 by means of an arm 379 (Fig. 6) which is pivoted at 381 on a hub 382 which is rigid on main rock shaft 89. Arm 379 is held in yielding engagement with hub 382 by a coil spring 383 which urges said arm against a stop 384 carried by said hub 382. When rock shaft 89 is turned to start spinning of the reels, arm 379 is raised to bring a pin 385 against the free end of arm 368, the latter being thus raised to return arm 373 and pawl 374 to their normal driving position on ratchet wheel 358. As rock shaft 89 returns to normal position, arm 379 is lowered and the stepped arm 368 is free to fall an amount determined by the position of lever 362.

Means is provided for removing pawl 378 from ratchet wheel 359 as arm 373 is returned to normal position relative to ratchet wheel 358. This mechanism is shown in Figs. 6 and 19. A lever 386, pivoted at 387 on arm 373, is provided at one end with a pin 388 which rests in an inwardly-grooved cam surface (Fig. 4) formed in a laterally projecting arm 389 carried by pawl 378. A spring 391, extending between arm 389 and the end of arm 373, holds pawl 378 against ratchet wheel 359. Lever 386 is turned to raise pawl 378 by a vertically disposed arm 392, the upper end of which is pivoted at 393 to a fixed arm carried by the frame. A curved segment portion 394 of arm 392 engages one end of lever 386. Arm 392 is actuated in the initial turning of rock shaft 89, the lower end of said arm being shoved laterally by a pin 395 (Fig. 7) carried by an arm 396 which is rigid with hub 382 carried on rock shaft 89. As arm 396 is raised pin 395 displaces arm 392 outwardly to pivot lever 386 thereby freeing pawl 378 from ratchet wheel 359 and allowing arm 373 to be raised into position for again actuating ratchet wheel 358.

As long as wheel 357 is displaced from its zero position the machine may be operated without inserting a coin. This action is effected through a lever 397 (Figs. 5 and 7) which is of bell crank form, the forwardly extending arm 398 thereof being provided with a hook which engages the upper end of coin-trip lever 103. The laterally extending arm 399 of lever 397 carries a lug 401 which is engaged by a stop 402 (Fig. 19) carried by wheel 357, said stop being so located on the wheel that when the latter is returned to the zero position, said stop will strike lug 401, thereby pivoting lever 397 to free arm 398 from coin-trip lever 103. It will be evident that when lever 103 is held by arm 398 the effect is the same as though a coin were present in the coin chute. As soon as wheel 357 is advanced one or more spaces by a winning combination, stop 402 is released from the end of lever 397, the latter being then pivoted by a spring (not shown) to hook arm 398 over coin-trip lever 103. Coin-trip lever 103 is thus rendered inoperative so long as wheel 357 is displaced from its starting position, the machine being thus rendered capable of free operation.

Means is provided for returning wheel 357 one space toward its starting position for each operation of the machine, this mechanism being shown in Fig. 19. An escapement 403, pivoted at 404 to the frame, engages the teeth of ratchet wheel 358, and permits the latter, together with wheel 357, to move one step in a counter-clockwise direction for each actuation of said escapement. Escapement 403 is rocked to return wheel 357 one space toward zero position by an arm 405 (Fig. 6), rigidly connected through hub 382 to rock shaft 89. When rock shaft 89 is turned to position for spinning the reels, arm 405 is raised and brushes past a spring-held pawl 406 carried on the lower end of escapement 403, the pivotal movement of said pawl on the escapement being limited by a stop 407. As rock shaft 89 returns to inoperative position arm 405 strikes pawl 406 on its downward stroke to actuate escapement 403. Wheel 357 is thus returned toward zero position one space per play to bring stop 402 in step-by-step movement toward lever 397, the latter being actuated when the wheel reaches zero position to thereafter require the insertion of a coin to operate the machine. A pawl 408, pivoted at 404, engages ratchet wheel 359 to prevent advance of wheel 357 when arm 373 is being returned to its actuating position, it being remembered that during this return movement, pawl 378 is raised to clear ratchet wheel 359. Pawl 408 is actuated from arm 405, thus operating in proper timed sequence with escapement 403.

Manually operable means is provided for re-setting wheel 357 to the starting or zero position, this mechanism being shown in Figs. 2, 3, 5, and 6. Mounted for rotation with wheel 357 on reel shaft 62 is a wheel 409, the circumferential rim portion of which is provided with a series of spaced apertures 411. Wheel 409 is rotated by turning a hand piece 415 projecting from the end wall of the machine, said piece connecting with a wheel 416 mounted for free rotation on a shaft 417 which is journaled in a frame piece 418. The inner end of shaft 417 carries a toothed wheel (not shown) which meshes with the apertures 411 in wheel 409. A pawl and ratchet connection (not shown) is provided between wheel 416 and shaft 417 so that when hand piece 415 is turned in a clockwise direction, viewing Fig. 2, wheels 409 and 357 will be turned in the same direction, the latter being thus restored to its zero position. A pawl and ratchet connection between wheel 357 and reel shaft 62 is provided so that said wheel may be re-set in regular step-by-step movements corresponding to the numbers carried on the periphery thereof. This connection, in the embodiment shown, comprises: an arm 412, extending between a pair of spokes of wheel 357; a pawl 413 pivoted on arm 412; and a ratchet wheel 414 rigid on shaft 62. When hand piece 415 is turned to re-set wheel 357 to zero position, pawl 413 rides over the teeth of ratchet wheel 414, the teeth of which correspond to the teeth in ratchet wheel 358, to permit of the return in step-by-step movement corresponding to the spacing of the numbers carried on the rim of said wheel. During the re-setting wheel 357 turns on shaft 62 independently of ratchet wheels 358, 359 and 414 by reason of the friction connection between it and ratchet wheel 359.

A counting device 419 which is driven from a spur wheel 420 (Fig. 5) carried by wheel 416 is provided to indicate the total return movement which is imparted to wheel 357 by hand piece 415. For example, if a player leaves the machine with a score of 350, the proprietor will turn hand piece 415 until wheel 357 is again at the starting position opposite number 300, the return of 50 spaces being recorded on counter 419. Similarly, when the next player leaves the machine and wheel 357 is re-set to zero position, counter 419 will accumulate the added score which this player has made. In this way the proprietor can keep track of the total winnings which have been made over a given period of time.

The operation of the award mechanism will be briefly outlined. Assuming wheel 357 is at the starting position with the numeral 300 opposite pointer 361, in this position stop 402 (Fig. 19) will hold lever 397 free of coin-trip lever 103 (Fig. 7). Upon the insertion of a coin and actuation of rock shaft 89, stepped arm 368 (Fig. 6) will be raised by arm 379 so that lever 362, which has been moved with slide bar 287 to its advanced position, will rest on the lowermost of the steps 372. As bar 368 is raised, arm 373 is raised to driving position relative to ratchet wheel 358, pawl 378 being held inoperative during this interval, and pawl 408 being actuated by arm 405 to prevent turning of wheel 357. Assuming that the reels have been so stopped that the combination is obtained which effects retraction of all but the uppermost slide 176, slide bar 287 will be retracted to allow arm 368 to fall until the uppermost of the steps 372 rests on lever 362, the position of the latter being controlled by the position of slide bar 287. Wheel 357 will then be advanced by pawl 374 the distance of sixteen spaces. A reading of 316 is then indicated by wheel 357, which means that 16 free operations of the machine will then be allowed, stop 402 being displaced sixteen spaces from zero position to allow lever 397 (Fig. 7) to hook over coin-trip lever 103, thereby permitting lowering of lever 77 (Fig. 7) and actuation of the main rock shaft 89 without the use of a coin. For each subsequent play of the machine, which, as explained, is a free play, escapement 403 will be actuated from rock shaft 89 through arm 405 and pawl 406 to allow wheel 357 to return one space toward the zero position, thus bringing stop 402 one step nearer the position in which it will release lever 397 and, in turn, coin-trip lever 103. If a player leaves the machine with a score of 340, the proprietor may give the player such an award as this score may call for, and then re-set wheel 357 to the starting position by turning hand piece 415.

The machine is provided with a vending mechanism which may be operated to deliver one of the mint rolls 48 each time the machine is played with a coin. Referring to Figs. 3 and 28–30, extending transversely across the lower ends of the vending compartments is a rotary ejector 431 which is adapted to be turned by a hand piece 432 projecting from the end of the machine casing. As shown in Fig. 1, the mints 48 are stacked in four separate compartments, two being disposed on each side of the playing field. Each compartment may be made from a strip of sheet metal which may be bent in channel form to provide a rear wall 433 and inwardly projecting flanges 434 on the front face of the compartment for engaging the ends of the rolls. These individual channel compartments may be secured to the front wall 44 of the casing in any suitable manner. Ejector 431 is arranged to discharge a roll from one of the vending compartments for each quarter revolution, it being cut away below each compartment, as indicated at 435, to allow the roll to fall toward the center of the ejector far enough to clear a rearwardly projecting back wall 436 when shifted to the position indicated by the dotted lines in Fig. 28. It will be understood that the cut-away portions 435 on the ejector which are located below the different compartments are spaced at 90 degrees relative to one another to effect delivery of a roll from one of the compartments for each quarter turn of the ejector. A roll falling from between the ejector and wall 436 falls into tray 49 from whence it may be removed by the operator.

Latch mechanism is provided for releasing the ejector 431 for a quarter turn each time the machine is played, this mechanism comprising in the present embodiment: a wheel 437, mounted to turn with ejector 431, and provided with four equally spaced latch teeth 438; a latch lever 439, fulcrumed at 441 on the frame and provided at its forward end with a laterally projecting lug 442 for engaging latch teeth 438; a link 443 (Fig. 3) having pin and slot connection at 444 with the frame, the lower end thereof being pivoted to the rear end of lever 439; a spring-held pawl 445 (Figs. 3 and 6) carried by arm 379; and an escapement 446, pivoted at 447 on the frame, and yieldingly connected to latch lever 439 by a coil spring 448.

In the latched position shown in Fig. 30 the free end of escapement 446 rests against lug 442, the latter being in engagement with one of the teeth 438 to prevent rotation of the ejector. In this position a shoulder 449 on escapement 446 rests on a pin 451 carried by wheel 437, there being four such pins equally spaced on said wheel. When the machine is actuated to raise arm 379, pawl 445 sweeps past the upper end of link 443. As arm 379 moves downwardly upon the spinning of the reels, pawl 445 strikes the upper end of link 443, displacing the latter downwardly, a stop 452 (Fig. 6) holding pawl 445 rigid with arm 379 when the latter is moved downwardly. The lowering of link 443 in this manner lifts latch lever 439 to clear teeth 438, the lug 442 in the unlatched position resting on the top of escapement 446. The ejector may then be turned in a clockwise direction, viewing Fig. 30, until the next of the teeth 438 approaches lug 442. At this point one of the pins 451 riding on cam surface 453 shifts escapement 446 rearwardly to release latch lever 439, which then falls against tooth 438 to prevent further turning of the ejector.

Means is provided for preventing further operation of the machine when the vending compartments have been emptied, this mechanism being shown in Figs. 5, 7, and 28. It consists of a bell crank lever 454 positioned in a depression 455 formed in the lower rear wall of one of the vending compartments. When there are mints in the mint chute, lever 454 is held in the position shown by the solid lines in Fig. 28. The rearwardly projecting arm of lever 454 rests against the forward end of an arm 456 which connects with a vertically disposed arm 457 (Fig. 7), the upper end of the latter being provided with a portion (not shown) which extends into coin chute 57. When the vending compartment is empty lever 454 tilts to the dotted line position shown in Fig. 28, this movement serving to move the upper end of arm 457 into the coin chute to prevent the introduction of a coin, coins thereafter introduced being diverted back to the operator through a lateral extension 458 (Fig. 1).

In the present embodiment the vending mechanism is not operable upon a free play or when an annular check is used to play the machine. This is due to the fact that under these conditions a lever 459 (Fig. 7), pivoted at 460 to the frame, and provided with a finger 480 extending into the coin chute, is drawn forwardly by a coil spring 470 to bring the lower end 459 thereof into the path of a lug (not shown) projecting inwardly from the free end of arm 379. In this case spring 383 yields sufficiently to allow rock shaft 89 to be actuated but prevents arm 379 from being raised sufficiently to actuate link 443 which releases the latch mechanism which holds ejector 431 against rotation.

The score-keeping device 52 (Fig. 1), which is manually operated to enable the operator to keep track of the status of the ball game, is shown in detail in Figs. 31–33. Projecting inwardly from front wall 45 are a pair of arms 461 between which extends a shaft 462, upon which are mounted for independent free rotation three wheels 463, 464, and 465, the rim portions of which project a short distance through a panel 466 secured over an opening in front wall 45. Mounted to turn respectively with each of wheels 463—465, are score dials 467, 468, and 469. These score dials are provided with numbers which may be viewed through transparent openings 471 formed in panel 466, said panel being marked adjacent these openings with words indicating the meaning of the numbers shown on the dials. The hub of each of the wheels 463—465 carries a star wheel 472, the teeth of which are yieldingly engaged by a roller 473 carried on the free end of an arm 474, the latter being pivoted on a rod 475 extending between arms 461. Roller 473 is held in yielding engagement with the star wheel 472 by a coil spring 476 extending between arm 474 and a plate 477 secured in the opening in front wall 45. The wheels may thus be advanced in step-by-step movements to bring the proper members into view opposite openings 471.

The foregoing detailed description has been given for clearness of understanding only, and no unnecessary limitations should be understood therefrom, but the appended claims should be construed as broadly as permissible in view of the prior art.

What I regard as new and desire to secure by Letters Patent is:

1. In a game apparatus: a playing field; player pieces variously positionable over the field; and coin-controlled means for determining the distance advanced by the pieces upon particular operations of the apparatus comprising a series of independently movable members normally assembled and retained in fixed position relative to one another, means for displacing a predetermined number of said members from their normal assembled position, and means for determining the moves of said pieces in accordance with the displaced positions of said members.

2. In a game apparatus: a playing field providing a home base and a series of field bases defining a playing circuit; player pieces adapted for movement along the circuit from the home base to the field bases; and coin-controlled means for determining the number of bases advanced by the pieces upon particular operations of the apparatus comprising a series of independently movable members normally assembled and retained in fixed position relative to one another, means for displacing a predetermined number of said members from their normal assembled position, and means for determining the moves of said pieces in accordance with the displaced positions of said members.

3. In a game apparatus: a playing field; player pieces variously positionable over the field; and coin-controlled means comprising a variably positionable stop member for regulating the moves of the pieces in accordance with a predetermined setting thereof, means for determining the position of said stop member, said last-mentioned means including a series of independently movable slides normally assembled and retained in fixed position relative to one another, and means for displacing a predetermined number of said slides from their normal assembled position.

4. In a game apparatus: a playing field; player pieces variously positionable over the field; and coin-controlled means comprising a plurality of independently rotatable elements, means for starting rotation of said elements, means for selectively stopping the rotation of said elements, and means for regulating the moves of the pieces in accordance with the positions of rest assumed by said elements.

5. In a game apparatus: a playing field; player pieces variously positionable over the field; and coin-controlled means comprising a plurality of independently rotatable elements, means for starting rotation of said elements, means for selectively stopping rotation of said elements, and means including a series of independently movable members for regulating the moves of the pieces in accordance with the positions of rest assumed by said rotatable elements.

6. In a game apparatus: a playing field; player pieces variously positionable over the field; and coin-controlled means comprising a plurality of legend-displaying reels, means for starting rotation of said reels, means for stopping rotation of said reels to present varying combinations of legends, and means including a series of retractable slides for regulating the moves of the pieces in accordance with the positions of rest assumed by the reels.

7. In a game apparatus: a playing field; player pieces variously positionable over the field; and coin-controlled means comprising a variably positionable stop member for regulating the moves of the pieces in accordance with a predetermined setting thereof, a plurality of independently rotatable elements, means for starting rotation of said elements, means for selectively stopping rotation of said elements, and means for determining the position of said stop member in accordance with the positions of rest assumed by said rotatable elements.

8. In a game apparatus: a playing field; player pieces variously positionable over the field; and coin-controlled means comprising a variably positionable stop member for regulating the moves of the pieces in accordance with a predetermined setting thereof, a plurality of independently rotatable elements, means for starting rotation of said elements, means for selectively stopping rotation of said elements, and means including a series of independently movable members for determining the position of said stop member in accordance with the positions of rest assumed by said rotatable elements.

9. In a game apparatus: a playing field; player pieces variously positionable over the field; and coin-controlled means comprising a plurality of independently rotatable elements, means for starting rotation of said elements, means for selectively stopping rotation of said elements, means for regulating the moves of the pieces in accordance with the positions of rest assumed by the elements, said last-mentioned means including a series of independently retractable members, means for holding said members in advanced position during the rotation of said elements, means operated by said elements for releasing one or more of said retractable members when the elements are stopped in certain positions relative to one another, and means for determining the moves of the pieces in accordance with the retracted positions of said retractable members.

10. A game aparatus comprising, in combination: a playing field providing a home base; player pieces normally stationed at the home base; means for moving said pieces from the home base to various positions on the field; a variably positionable stop member for regulating the operation of said player moving means in accordance with a predetermined setting thereof; and coin-controlled means comprising a series of independently movable members for regulating the setting of said stop member in accordance with the displaced positions of said movable members.

11. A game apparatus comprising, in combination: a playing field providing a home base;

player pieces normally stationed at the home base; means for moving said pieces from the home base to various positions on the field; a variably positionable stop member for regulating the operation of said player-moving means in accordance with a predetermined setting thereof; and coin-controlled means for regulating the setting of said stop member comprising a plurality of independently rotatable elements, means for starting rotation of said elements, means for selectively stopping rotation of said elements, and means operatively connecting said elements with said stop member whereby the moves of the pieces are determined by the positions of rest assumed by said elements.

12. A game apparatus comprising, in combination: a playing field providing a home base; player pieces normally stationed at the home base; means for moving said pieces from the home base to various positions on the field; a variably positionable stop member for regulating the operation of said player-moving means in accordance with a predetermined setting thereof; and coin-controlled means for regulating the setting of said stop member comprising a plurality of legend-displaying reels, means for starting rotation of said reels, means for stopping rotation of said reels to present varying combinations of legends, a series of retractable slides normally held in advanced position during the spinning of the reels, means operated by the reels for releasing one or more of the slides when the reels are stopped in certain positions relative to one another, a follower bar arranged for displacement from a normally-advanced position to various retracted positions depending upon the number of slides released, and means operatively connecting said bar with said stop member, whereby the moves of the pieces are determined in accordance with the positions of rest assumed by the reels.

13. In a game apparatus: a playing field providing a home base and a series of field bases defining a playing circuit; player pieces adapted for movement along the circuit from the home base to the field bases; means for retaining said pieces at the home base, said means being operable to release the pieces one at a time for movement along the circuit; and coin-controlled means for regulating the moves of the pieces comprising a series of independently movable members normally assembled and retained in fixed position relative to one another, means for displacing a predetermined number of said members from their normal assembled position, and means for determining the moves of said pieces in accordance with the displaced positions of said members.

14. In a game apparatus: a playing field providing a home base and a series of field bases defining a playing circuit; player pieces adapted for movement along the circuit from the home base to the field bases; means for retaining said pieces at the home base, said means being operable to release the pieces one at a time for movement along the circuit; and coin-controlled means comprising a plurality of independently rotatable elements, means for starting rotation of said elements, means for selectively stopping the rotation of said elements, and means for regulating the moves of the pieces in accordance with the positions of rest assumed by said rotatable elements.

15. A game apparatus comprising, in combination: a playing field providing a home base; player pieces; means normally retaining said pieces at the home base, said means being operable to release the pieces one at a time for movement over the field; means for moving the pieces to various field positions; a variably positionable stop member for limiting the operation of said player-moving means in accordance with a predetermined setting thereof; and coin-controlled means including a plurality of independently movable members and means for positioning said stop member in accordance with the displacement of said movable members.

16. A game apparatus comprising, in combination: a playing field providing a home base; player pieces; means normally retaining said pieces at the home base, said means being operable to release the pieces one at a time for movement over the field; means for moving the pieces to various field positions; a variably positionable stop member for limiting the operation of said player-moving means in accordance with a predetermined setting thereof; coin-controlled means including a plurality of independently movable members, and means for positioning said stop member in accordance with the displacement of said movable members; and means for actuating said player release means upon the displacement of one or more of said movable members.

17. In a game apparatus: a playing field providing a home base and a series of field pieces defining a playing circuit; player pieces adapted for movement along the circuit from the home base to the field bases; means for retaining said pieces at the home base, said means being operable to release the pieces one at a time for movement along the circuit; coin-controlled means for regulating the moves of the pieces comprising a series of independently retractable members, and means for determining the moves of the pieces in accordance with the retracted positions of said members; and means for actuating said player release means upon the retraction of one or more of said members.

18. In a game apparatus: a playing field providing a home base and a series of field bases defining a playing circuit; player pieces adapted for movement along the circuit from the home base to the field bases; means for retaining said pieces at the home base, said means being operable to release the pieces one at a time for movement along the circuit; coin-controlled means comprising a plurality of independently rotatable elements, means for starting rotation of said elements, means for selectively stopping rotation of said elements, and means including a series of independently retractable members for regulating the moves of the pieces in accordance with the positions of rest assumed by said elements; and means for actuating said player release means upon the retraction of one or more of said members.

19. In a game apparatus: a playing field providing a home base and a series of field bases defining a playing circuit; player pieces adapted for movement from base to base along the playing circuit; means for retaining said pieces at the home base, said means being operable to release the pieces one at a time for movement along the circuit; means for obstructing advance of the pieces between the field bases; means operable upon the release of a piece from the home base to advance along the circuit such of the pieces as have been released; means rendering said obstructing means inoperative during the operation of the player-moving means; and coin-controlled means including a plurality of independently movable members and means for determining the moves of the pieces in accordance with the displaced positions of said members.

20. A game apparatus comprising, in combination: a playing field providing a home base and a series of field bases defining a playing circuit; a rotatable shaft; arms supported on said shaft and adapted to be driven thereby; player pieces supported on said arms and movable therewith over the field along the playing circuit; means for retaining said pieces at the home base, said means being operable to release the pieces one at a time for movement along the circuit; drive means operable upon the release of a piece from the home base to turn said shaft to advance such of the pieces as have been released; and coin-controlled means for regulating the moves of the pieces comprising a series of independently movable members normally assembled and retained in fixed position relative to one another, means for displacing a predetermined number of said members from their normal assembled position, and means for limiting the operation of said drive means in accordance with the displaced positions of said members.

21. A game apparatus comprising, in combination: a playing field providing a home base and a series of field bases defining a playing circuit; a rotatable shaft; arms supported on said shaft and adapted to be driven thereby; player pieces supported on said arms and movable therewith over the field along the playing circuit; means for retaining said pieces at the home base, said means being operable to release the pieces one at a time for movement along the circuit; drive means operable upon the release of a piece from the home base to turn said shaft to advance such of the pieces as have been released; and coin-controlled means comprising a plurality of independently rotatable elements, means for starting rotation of said elements, means for stopping rotation of said elements, and means for limiting the operation of said drive means in accordance with the positions of rest assumed by said elements.

22. A game apparatus comprising, in combination: a playing field providing a home base and a series of field bases defining a playing circuit; a rotatable shaft; arms supported on said shaft and adapted to be driven thereby; player pieces supported on said arms and movable therewith over the field along the playing circuit; means for retaining said pieces at the home base, said means being operable to release the pieces one at a time for movement along the circuit; drive means operable upon the release of a piece from the home base to turn said shaft to advance such of the pieces as have been released; coin-controlled means for regulating the moves of the pieces comprising a series of retractable slides and means for limiting the operation of said drive means in accordance with the retracted positions of said slides; and means for actuating said player release means upon the retraction of one or more of the slides.

23. A game apparatus comprising, in combination: a playing field providing a home base and a series of field bases defining a playing circuit; a rotatable shaft; arms supported on said shaft and adapted to be driven thereby; player pieces supported on said arms and movable therewith over the field along the playing circuit; means for retaining said pieces at the home base, said means being operable to release the pieces one at a time for movement along the circuit; drive means operable upon the release of a piece from the home base to turn said shaft to advance along the circuit such of the pieces as have been released; a variably positionable stop member for limiting the operation of said drive means in accordance with a predetermined setting thereof; and coin-controlled means for regulating the position of said stop member comprising a series of retractable slides and means for positioning said stop member in accordance with the retracted positions of the slides.

24. A game apparatus comprising, in combination: a playing field providing a home base and a series of field bases defining a playing circuit; a rotatable shaft; arms supported on said shaft and adapted to be driven thereby; player pieces supported on said arms and movable therewith over the field along the playing circuit; means for retaining said pieces at the home base, said means being operable to release the pieces one at a time for movement along the circuit; drive means operable upon the release of a piece from the home base to turn said shaft to advance along the circuit such of the pieces as have been released; a variably positionable stop member for limiting the operation of said drive means in accordance with a predetermined setting thereof; and coin-controlled means comprising a plurality of independently rotatable elements, means for starting rotation of said elements, means for selectively stopping rotation of said elements, and means for positioning said stop member in accordance with the positions of rest assumed by the elements.

25. A game apparatus comprising, in combination: a playing field; player pieces variously positionable over the field; a normally coin-controlled operating mechanism for regulating the moves of said pieces; and award means actuated by said operating mechanism for giving the operator a predetermined number of free plays following each operation of the operating mechanism which effects the move of a player piece.

26. A game apparatus comprising, in combination: a playing field; player pieces variously positionable over the field; a normally coin-controlled operating mechanism for regulating the moves of said pieces; and award means actuated by said operating mechanism for giving the operator a predetermined number of free plays following each operation of the operating mechanism which effects the move of a player piece, said means including mechanism for cumulating the free plays by adding to the number of plays awarded on a winning play the number of plays awarded on a subsequent winning play.

27. A game apparatus comprising, in combination: a playing field; player pieces variously positionable over the field; a normally coin-controlled operating mechanism comprising a series of independently retractable members and means for determining the moves of said pieces in accordance with the retracted positions of said members; and award means actuated by said operating mechanism for giving the operator a predetermined number of free plays following each operation of the operating mechanism which effects the move of a player piece.

28. A game apparatus comprising, in combination: a playing field; player pieces variously positionable over the field; a normally coin-controlled operating mechanism for regulating the moves of said pieces comprising a series of independently movable members normally assembled and retained in fixed position relative to one another, means for displacing a predetermined number of said members from their normal assembled position, and means for determining the moves of said pieces in accordance with the displaced positions of said members; and award means operable in accordance with the displacement of said members to give the operator a number of free plays following each operation of the operating mechanism which effects the move of a player piece.

29. A game apparatus comprising, in combination: a playing field; player pieces variously positionable over the field; a normally coin-controlled operating mechanism comprising a plurality of independently rotatable elements, means for starting rotation of said elements, means for selectively stopping rotation of said elements, and means for regulating the moves of the pieces in accordance with the positions of rest assumed by said elements; and award means actuated by said operating mechanism for giving the operator a predetermined number of free plays following each operation of the operating mechanism which effects the move of a player piece.

30. A game apparatus comprising, in combination, a playing field; player pieces variously positionable over the field; a normally coin-controlled operating mechanism for regulating the moves of said pieces; and award means actuated by said operating mechanism for giving the operator a number of free plays following each operation of the operating mechanism which effects the move of a player piece, said means comprising a coin-operated locking member for preventing operation of said operating mechanism without the use of a coin, and means for holding said locking member in inoperative position during a predetermined interval of play.

31. A game apparatus comprising, in combination: a playing field; player pieces variously positionable over the field; a normally coin-controlled operating mechanism for regulating the moves of the player pieces; and award means actuated by said operating mechanism for giving the operator a number of free plays following each operation of the operating mechanism which effects the move of a player piece, said means comprising a coin-operated locking member for preventing operation of said operating mechanism without the use of a coin, means for holding said locking member in inoperative position, and means for releasing said holding means to restore said locking member to operative position after a predetermined number of plays.

32. A game apparatus comprising, in combination: a playing field; player pieces variously positionable over the field; a normally coin-controlled operating mechanism comprising a series of retractable slides and means for determining the moves of the pieces in accordance with the retracted positions of said slides; and award means operable in accordance with the displacement of said slides to give the operator a number of free plays following each operation of the operating mechanism which effects the move of a player piece, said means comprising a coin-operated locking member for preventing operation of said coin-controlled mechanism without the use of a coin, means for holding said locking member in inoperative position, and means for releasing said holding means to restore said locking member to operative position after a predetermined number of plays, said last-mentioned means comprising a wheel provided with a pin for actuating said holding means, drive mechanism for turning said wheel to displace the pin from operative position a distance dependent upon the number of slides retracted, and an escapement operative to return said pin in step-by-step movements toward operative position upon successive operations of the operating mechanism.

33. In a game apparatus: a playing field providing a home base; player pieces normally stationed at the home base; means for moving said pieces from the home base to various positions on the field; a variably positionable stop member for regulating the operation of said player-moving means in accordance with a predetermined setting thereof; a normally coin-controlled operating mechanism including a series of independently movable members for regulating the setting of said stop member in accordance with the displacement of said movable members; and award means operable in accordance with the displacement of said members to give the operator a number of free plays following each operation of the operating mechanism which effects the move of a player piece.

34. In a game apparatus: a playing field providing a home base and a series of field bases defining a playing circuit; a rotatable shaft; arms supported on said shaft and adapted to be driven thereby; player pieces supported on said arms and movable therewith over the field along the playing circuit; means disposed in the path of the playing circuit for obstructing advance of the pieces between the field bases; coin-controlled drive means for turning said shaft to mechanically advance the pieces along the circuit; and means rendering said obstructing means inoperative during the operation of said drive means to permit advance of the pieces between the field bases.

35. In a game apparatus: a playing field providing a home base and a series of field bases defining a playing circuit; a rotatable shaft; arms supported on said shaft and adapted to be driven thereby; player pieces supported on said arms and movable therewith over the field along the playing circuit; means disposed in the path of the playing circuit for obstructing advance of the pieces between the field bases; coin-controlled drive means for turning said shaft to advance the pieces along the circuit; and means rendering said obstructing means inoperative during the operation of said drive means to permit advance of the pieces between the field bases, said last-mentioned means including mechanism for shifting said obstructing means to position for arresting advance of the pieces after a predetermined amount of movement of said drive means.

36. A game apparatus comprising, in combination: a playing field; player pieces variously positionable over the field; a normally coin-controlled operating mechanism for regulating the moves of said pieces; award means actuated by said operating mechanism for giving the operator a predetermined number of free plays following each operation of the operating mechanism which effects the move of a player piece; and vending mechanism operative to dispense an article of merchandise upon each coin operation of the operating mechanism.

37. In a game apparatus, the combination of a rotatable element; coin-controlled mechanism for starting rotation of said element; means for stopping rotation of said element; and means for giving the operator a number of free plays determined in accordance with the position of rest assumed by said element, said free play means including a movable member, means controlled by said rotatable element, and operative when the latter comes to rest at certain positions, to displace said member from a zero position and advance the same through a series of positions away from the zero position, and means controlled by said movable member for rendering said starting mechanism operable without the use of a coin when said member is away from the zero position.

38. In a game apparatus, the combination of a rotatable element; coin-controlled mechanism for starting rotation of said element; means for stopping rotation of said element; and means for giving the operator a number of free plays determined in accordance with the position of rest assumed by said element, said last-mentioned means including mechanism for cumulating the free plays by adding to the number of such plays obtained on one operation of the apparatus the number of free plays resulting from a subsequent operation.

39. In a game apparatus, the combination of a rotatable element; coin-controlled mechanism for starting rotation of said element; means for stopping rotation of said element; and means for giving the operator a number of free plays determined in accordance with the position of rest assumed by said element, said last-mentioned means comprising a coin-operated locking member for preventing operation of said coin-controlled mechanism without the use of a coin, means for holding said locking member in inoperative position, and means operative upon the last free play of the apparatus to release said holding means whereby to restore said locking member to operative position.

40. In a game apparatus, the combination of a rotatable element; coin-controlled mechanism for starting rotation of said element; means for stopping rotation of said element; and means for giving the operator a number of free plays determined in accordance with the position of rest assumed by said element, said last-mentioned means comprising a coin-operated locking member for preventing operation of said coin-controlled mechanism without the use of a coin, means for holding said locking member in inoperative position, and means for releasing said holding means to restore said locking member to operative position, said last-mentioned means comprising a wheel provided with a pin for actuating said holding means, drive mechanism for turning said wheel to displace the pin from operative position a distance dependent upon the position assumed by said rotatable element, and an escapement operative to return said pin in step-by-step movements toward operative position upon successive operations of the apparatus.

41. In a game apparatus, the combination of a plurality of independently rotatable elements; coin-controlled mechanism for starting rotation of said elements; means for stopping the rotation of said elements; and means for giving the operator a number of free plays determined in accordance with the positions of rest assumed by said elements, said free play means including a movable member, means controlled by said rotatable elements, and operative when the latter come to rest at certain positions, to displace said member from a zero position and advance the same through a series of positions away from the zero position, and means controlled by said movable member for rendering said starting mechanism operable without the use of a coin when said member is away from the zero position.

42. In a game apparatus, the combination of a plurality of legend-displaying reels; coin-controlled mechanism for starting rotation of said reels; means for stopping the rotation of said reels to present varying combinations of legends; and means for giving the operator a number of free plays determined in accordance with the positions of rest assumed by said reels, said free play means including a movable member, means controlled by said reels, and operative when the latter come to rest at certain positions, to displace said member from zero position and advance the same through a series of positions away from the zero position, and means controlled by said movable member for rendering said starting mechanism operable without the use of a coin when said member is away from the zero position.

43. In a game apparatus, the combination of a plurality of legend-displaying reels; coin-controlled mechanism for starting rotation of said reels; manually operable devices for stopping rotation of the reels to fix their positions of rest according to the skill of the operator; means for automatically stopping rotation of said reels in the event of failure of the operator to operate said manually operable devices; means for giving the operator a number of free plays determined in accordance with the positions of rest assumed by said reels, said free play means including a movable member, means controlled by said reels and operative when the latter come to rest at certain positions to displace said member from a zero position and advance the same through a series of positions away from the zero position, and means controlled by said movable member for rendering said starting mechanism operable without the use of a coin when said member is away from the zero position.

44. In a game apparatus, the combination of a rotatable element; coin-controlled mechanism for starting rotation of said element; means for stopping rotation of said element; and means for giving the operator a number of free plays determined in accordance with the position of rest assumed by said element, said last-mentioned means including a register device for indicating a score based upon the number of free plays obtained.

45. In a game apparatus, the combination of a rotatable element; coin-controlled mechanism for starting rotation of said element; means for stopping rotation of said element; and means for giving the operator a number of free plays determined in accordance with the position of rest assumed by said element, said last-mentioned means including a register device for automatically indicating a score based upon the number of free plays obtained, said device including means for cumulating the scores by adding to the score obtained on one operation of the apparatus the score resulting from a subsequent operation.

46. In a game apparatus, the combination of a rotatable element; coin-controlled mechanism for starting rotation of said element; means for stopping rotation of said element; and means for giving the operator a number of free plays determined in accordance with the position of rest assumed by said element, said last-mentioned means including a register device for automatically indicating a score based upon the number of free plays obtained, said device including means for cumulating the scores by adding to the score obtained on one operation of the apparatus the score resulting from a subsequent operation and additional means for subtracting from the accumulated total a penalty incurred on each operation which fails to produce a score.

47. In a game apparatus, the combination of a series of independently movable members normally assembled and retained in fixed position relative to one another; coin-controlled mechanism for displacing a predetermined number of said members from their normal assembled position; and means for giving the operator a number of free plays determined in accordance with the displaced positions of said members, said free play means including a movable element, means controlled by said movable members and operative when the latter become displaced to certain positions to move said element from a zero position and advance the same through a series of positions away from the zero position, and means controlled by said movable element for rendering said displacing mechanism operable without the use of a coin when said element is away from the zero position.

48. In a game apparatus, the combination of a plurality of independently rotatable elements; coin-controlled mechanism for starting rotation of said elements; means for stopping rotation of said elements; a series of retractable slides normally held in advanced position during the rotation of said elements; means operated by said elements for releasing one or more of the slides when said elements are stopped in certain positions relative to one another; and means operatively connected with said starting mechanism for giving the operator a number of free plays determined in accordance with the retracted positions assumed by said slides.

49. In a game apparatus, the combination of a rotatable element; coin-controlled mechanism for starting rotation of said element; means for stopping rotation of said element; and means for giving the operator a number of free plays determined in accordance with the position of rest assumed by said element; said last-mentioned means including a register device for automatically indicating a score based upon the number of free plays obtained, said device including means for cumulating the scores by adding to the score obtained on one operation of the apparatus the score resulting from a subsequent operation and additional means for subtracting from the accumulated total a penalty incurred on each operation which fails to produce a score.

50. In a game apparatus, the combination of: a normally coin-controlled operating mechanism; a movable member, means actuated by said operating mechanism, and operative upon certain operations thereof, to displace said member from a normal starting position and advance the same through a series of positions away from the starting position; and means controlled by said movable member for capacitating said operating mechanism for effective action without the use of a coin therein when said member is away from starting position, thus allowing the operator a number of free plays determined in accordance with the position of said movable member.

51. In a game apparatus, the combination of: a normally coin-controlled operating mechanism; a movable member, means actuated by said operating mechanism, and operative upon certain operations thereof, to displace said member from a normal starting position and advance the same through a series of positions away from the starting position; and means controlled by said movable member for capacitating said operating mechanism for effective action without the use of a coin therein when said member is away from starting position, thus allowing the operator a number of free plays determined in accordance with the position of said movable member, said means including a registering element for indicating the number of free plays obtained on any particular operation of said operating mechanism.

52. In a game apparatus, the combination of: coin-controlled operating mechanism; a locking device for normally preventing effective operation of said mechanism in the absence of a coin properly placed therein; a movable member, means actuated by said operating mechanism, and operative upon certain operations thereof, to displace said member from a normal starting position and advance the same through a series of positions away from the starting position; and means controlled by said movable member for rendering said locking device ineffective when said member is away from said starting position, thus allowing the operator a number of free plays determined in accordance with the position of said movable member.

53. In a game apparatus, the combination of: a normally coin-controlled operating mechanism; and a free play device, including a register having a rotatable element, means actuated by said operating mechanism, and operative upon certain operations thereof, to turn said element from a zero position through a series of free play registering positions, and means controlled by said element for capacitating said operating mechanism for effective action without the use of a coin therein when said element is away from zero position, thus allowing the operator a number of free plays determined in accordance with the position of said rotatable element.

FRED L. MILLS.